United States Patent
Oh et al.

(10) Patent No.: US 11,069,902 B2
(45) Date of Patent: Jul. 20, 2021

(54) CATALYST ELECTRODE FOR OXYGEN EVOLUTION AND METHOD FOR PREPARING THE SAME

(71) Applicant: KOREA ADVANCED INSTITUTE OF SCIENCE AND TECHNOLOGY, Daejeon (KR)

(72) Inventors: Ilkwon Oh, Daejeon (KR); Seok-Hu Bae, Daejeon (KR); Ji Eun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 252 days.

(21) Appl. No.: 15/703,653

(22) Filed: Sep. 13, 2017

(65) Prior Publication Data

US 2018/0212254 A1    Jul. 26, 2018

(30) Foreign Application Priority Data

Jan. 25, 2017  (KR) ........................ 10-2017-0011873

(51) Int. Cl.
*H01M 4/90* (2006.01)
*H01M 4/88* (2006.01)
(Continued)

(52) U.S. Cl.
CPC ............. *H01M 4/9025* (2013.01); *C25B 1/04* (2013.01); *C25B 11/031* (2021.01);
(Continued)

(58) Field of Classification Search
CPC ......... H01M 2004/021; H01M 4/0404; H01M 4/667; H01M 2300/0094; H01M 4/366; H01M 4/8605; H01M 4/9083; H01M 4/96
See application file for complete search history.

(56) References Cited

U.S. PATENT DOCUMENTS

| | | | |
|---|---|---|---|
| 6,451,073 B1 * | 9/2002 | Farahmandi | H01G 9/038 29/25.03 |
| 2007/0003749 A1 * | 1/2007 | Asgari | A61L 27/56 428/304.4 |

(Continued)

FOREIGN PATENT DOCUMENTS

| EP | 3211125 A1 | 8/2017 |
|---|---|---|
| KR | 10-1670929 B1 | 11/2016 |

OTHER PUBLICATIONS

Seok-Hu Bae et al.: "Seamlessly Conductive 3D Nanoarchitecture of Core-Shell Ni—Co Nanowire Network for Highly Efficient Oxygen Evolution", Advanced Energy Materials, vol. 7, Issue 1, Jan. 11, 2017.

(Continued)

*Primary Examiner* — Imran Akram
(74) *Attorney, Agent, or Firm* — Merchant & Gould P.C.

(57) ABSTRACT

The present invention provides a catalyst electrode for oxygen evolution comprising an electrode current collector comprising a carbon fiber fabric, a nanowire layer comprising a metal oxide-based porous nanowire grown radially from the surface of the carbon fiber, and a porous carbon coating layer disposed around the outer surface of the nanowire, thereby maximizing the specific surface area and increasing the electron transfer rate, and thus exhibiting an excellent catalytic activity for oxygen evolution reaction, and a preparation method thereof.

17 Claims, 23 Drawing Sheets

High activity for oxygen evolution    Fast electron transport thorough carbonaceous configuration    Integrated 3D catalytic electrode

(51) Int. Cl.
*H01M 4/86* (2006.01)
*C25B 1/04* (2021.01)
*C25B 11/031* (2021.01)
*C25B 11/057* (2021.01)
*C25B 11/091* (2021.01)

(52) U.S. Cl.
CPC .......... *C25B 11/057* (2021.01); *C25B 11/091* (2021.01); *H01M 4/8673* (2013.01); *H01M 4/8882* (2013.01); *H01M 4/9016* (2013.01); *H01M 4/9083* (2013.01); *Y02E 60/36* (2013.01)

(56) References Cited

U.S. PATENT DOCUMENTS

| | | | | |
|---|---|---|---|---|
| 2007/0048521 | A1* | 3/2007 | Istvan | D01F 9/20 428/367 |
| 2007/0190880 | A1* | 8/2007 | Dubrow | B01D 69/141 442/181 |
| 2011/0177398 | A1* | 7/2011 | Affinito | H01M 4/405 429/325 |
| 2012/0028798 | A1* | 2/2012 | Worsley | C01B 33/027 502/439 |
| 2012/0161663 | A1* | 6/2012 | Gregersen | H01L 33/06 315/246 |
| 2012/0183856 | A1* | 7/2012 | Cui | H01M 4/366 429/223 |
| 2013/0089769 | A1* | 4/2013 | Proctor | H01G 11/46 429/127 |
| 2013/0171502 | A1* | 7/2013 | Chen | H01M 4/131 429/149 |
| 2014/0170478 | A1* | 6/2014 | Liao | H01M 4/505 429/199 |
| 2015/0236185 | A1* | 8/2015 | Cutler | H01L 31/101 307/151 |
| 2015/0349346 | A1* | 12/2015 | Yushin | H01M 10/0587 429/231.95 |
| 2017/0018768 | A1* | 1/2017 | Yushin | H01M 4/582 |
| 2017/0062143 | A1* | 3/2017 | Zhamu | H01G 11/28 |
| 2017/0062812 | A1* | 3/2017 | Kim | H01M 4/8636 |

OTHER PUBLICATIONS

Rong Chen et al.: "A flexible high-performance oxygen evolution electrode with three-dimensional NiCo2O4 core-shell nanowires", Nano Energy, Jan. 2015, vol. 11, pp. 333-340.
Chao Jin et al.: "Facile synthesis and excellent electrochemical properties of NiCo2O4 spinel nanowire arrays as a bifunctional catalyst for the oxygen reduction and evolution reaction", Journal of Materials Chemistry A, 2013, vol. 1, pp. 12170-12177.
Weina Shi et al.: "Carbon coated Cu2O nanowires for photo-electrochemical water splitting with enhanced activity", Applied Surface Science, vol. 358, 2015, pp. 404-411.
Jun Wang et al.: "Integrated Three-Dimensional Carbon Paper/ Carbon Tubes/Cobalt-Sulfide Sheets as an Efficient Electrode for Overall Water Splitting", ACS Nano, Jan. 19, 2016, vol. 10, Issue 2, pp. 2342-2348.

* cited by examiner

CATALYST ELECTRODE FOR OXYGEN EVOLUTION AND METHOD FOR PREPARING THE SAME

TECHNICAL FIELD

This application claims the benefit of priority based on Korean Patent Application No. 10-2017-0011873 filed on Jan. 25, 2017 with the Korean Intellectual Property Office, the disclosure of which is incorporated herein by reference in its entirety.

The present invention relates to a catalyst electrode for oxygen evolution and a method for preparing the same. More specifically, the present invention provides a highly conductive three-dimensional nanowire-based catalyst electrode for oxygen evolution and a method for preparing the same.

BACKGROUND ART

Recently, among the methods of producing hydrogen in the airflow in hydrogen energy industry, a method of producing hydrogen through electrolysis of water has gained significant attention because there are a number of advantages that not only hydrogen can be produced without pollution but also the unlimited supply of water is available. However, in the electrolysis of water, the slow reaction rate at the anode electrode where oxygen is generated causes a large energy loss, which is problematic.

In order to solve these problems, a method using a metal catalyst has been proposed, but these metal catalysts use expensive rare metal oxides, such as $IrO_2$ or $RuO_2$, thereby causing a problem of high cost. Thus, a catalyst using metal oxide-based nanomaterials, which are relatively inexpensive, has been mainly developed. However, since the metal oxide-based nanomaterials have conductivity lower than that of pure metal materials or carbon-based materials, there is a limitation in increasing the catalytic activity. Therefore, there is a need to develop a catalyst electrode exhibiting an excellent catalytic activity based on a relatively inexpensive metal oxide.

DISCLOSURE

Technical Problem

It is one object of the present invention to provide a catalyst electrode for oxygen evolution which exhibits an excellent catalytic activity for the oxygen evolution reaction (OER) by maximizing the specific surface area and increasing the electron transfer rate, and a preparation method thereof.

Further, it is another object of the present invention to provide a hydrogen energy source device including the catalyst electrode.

Technical Solution

According to one embodiment of the present invention, there is provided a catalyst electrode for oxygen evolution comprising: an electrode current collector including a carbon fiber fabric; a nanowire layer including a metal oxide-based porous nanowire grown radially from the surface of the carbon fiber; and a porous carbon coating layer disposed around the outer surface of the nanowire.

Further, according to another embodiment of the present invention, there is provided a method for preparing the catalyst electrode for oxygen evolution comprising the steps of: forming a precursor nanowire for forming a metal oxide-based nanowire on an electrode current collector including a carbon fiber fabric through a hydrothermal reaction in a precursor solution for forming a metal oxide-based nanowire, and coating the surface of the precursor nanowire for forming a metal oxide-based nanowire using a precursor solution for forming a carbon coating layer, followed by subjecting it to hydrothermal carbonization at 120 to 200° C., and then annealing at 250 to 800° C.

Furthermore, according to still another embodiment of the present invention, there is provided a hydrogen energy source device including the catalyst electrode for oxygen evolution.

Advantageous Effects

The catalyst electrode according to the present invention is grown radially on the electrode current collector, the specific surface area thereof is maximized by including the porous metal oxide-based nanowire, and the electrode current collector and the carbon coating layer surrounding the surface of the metal oxide-based nanowires serve as a passage through which electrons can move quickly, thereby exhibiting an excellent catalytic activity. Accordingly, the catalyst electrode may be useful in an electrochemical reaction system, particularly, a hydrogen energy source device such as a fuel cell requiring hydrogen production through electrolysis of water.

BRIEF DESCRIPTION OF DRAWINGS

In FIG. 3, the inset was observed by SEM before and after the formation of the nanowires.

(In FIG. 9, a) is a high angle annular dark-field (HAADF) image showing the mapping regions, b) to e) are element mapping images for each element of Co, Ni, O and C, and f) is a composite image after a signal combination of b) to e)).

DETAILED DESCRIPTION OF THE EMBODIMENTS

Figure 1:
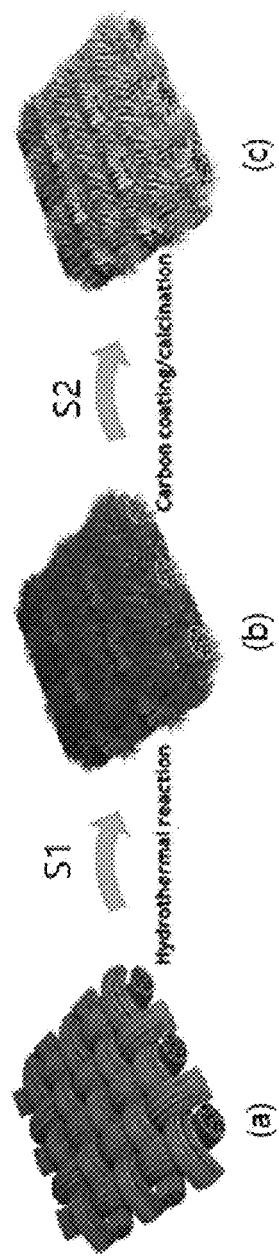
FIG. 1 is a schematic diagram showing the process for preparing the catalyst electrode for oxygen evolution according to one embodiment of the present invention.

Further, the terminology used herein is for the purpose of describing particular embodiments only and is not intended to be limiting. As used herein, the singular forms "a," "an" and "the" are intended to include the plural forms unless the context clearly indicates otherwise. In the present disclosure, it will be further understood that the terms "comprise", "include", "have", etc. specify the presence of stated features, steps, elements or combinations thereof but do not preclude the presence or addition of one or more other features, steps, elements or combinations thereof.

In addition, in the present disclosure, it will be understood that when each layer or element is referred to as being formed "on" or "over" each of the layers or elements, each layer or element can be directly formed on each of the layers or elements, or another layer or element may be additionally formed between each layer, or on an object or substrate.

While a variety of modifications may be made to the present invention and there are various embodiments of the invention, examples of which will now be described in detail. However, this is not intended to limit the present invention to particular modes of practice, and it is to be appreciated that all modifications, equivalents and substitutions that do not depart from the sprit and technical scope of the invention are encompassed in the present invention.

As used herein, the term "nano" refers to a nano scale ranging from several nanometers to several tens of micrometers (μm), and specifically includes a size of 5000 nm or less, more specifically, a size of 1000 nm or less.

Hereinafter, the catalyst electrode according to a specific embodiment of the present invention and the preparation method thereof, etc. will be described.

The catalyst electrode according to one embodiment of the present invention comprises,
an electrode current collector including a carbon fiber fabric;
a nanowire layer including a metal oxide-based porous nanowire grown radially from the surface of the carbon fiber; and
a porous carbon coating layer disposed around the outer surface of the nanowire.

By directly growing porous nanowires on the carbon fiber fabric, it has a higher specific surface area. Also, by forming a carbon coating layer which is composed of carbon, i.e., the same kind of element as the carbon fiber fabric and has porosity together with excellent conductivity, on the outer surface of the nanowires, it allows a rapid electron transfer between the carbon fiber fabric and the nanowires. Accordingly, it can exhibit more excellent catalytic activity when used as a catalyst electrode for oxygen evolution.

Specifically, the catalyst electrode according to one embodiment of the present invention includes the carbon fiber fabric as a substrate or a current collector for an electrode.

The carbon fiber fabric is based on a fiber fabric having excellent mechanical properties, can provide a wide specific surface area compared to a film or the like and can exhibit more excellent mechanical properties than commonly known carbon fiber mats or carbon fibers made by electrospinning. In addition, the carbon fiber fabric not only exhibits excellent conductivity by itself, but also reduces the contact resistance by including the same kind of element as in the carbon coating layer which will be described later.

Specifically, the carbon fiber fabric includes a weave construction such as plain weave or twill weave, but is not particularly limited thereto. The plain weave may be preferred.

Further, when the carbon fiber fabric is a plain weave, the weave count, specifically the number of warp threads per cm (warp per cm) may be 15 to 30, more particularly 18 to 20, and the number of filaments (fill per cm) may be 15 to 30, more specifically 17 to 19. Herein, the filament may have a diameter of 5 to 10 μm, more particularly 7 to 9 μm, and a density of 1.7 to 1.8 $g/cm^3$, more specifically 1.75 to 1.77 $g/cm^3$.

Furthermore, the thickness of the carbon fiber fabric may be 250 to 500 μm, more specifically 330 to 400 μm.

In addition, the density of the carbon fiber fabric may be 1.2 to 2 $g/cm^3$, more specifically 1.5 to 1.8 $g/cm^3$.

The carbon fiber fabric satisfying such physical requirements can exhibit excellent mechanical properties in terms of flexural strength, flexural modulus, and interlaminar shear strength together with excellent conductivity.

Meanwhile, a nanowire layer is disposed on the surface of the carbon fiber fabric as described above. The nanowire layer includes metal oxide-based nanowires grown radially from the surface of the carbon fibers. The nanowires, which are formed by continuously producing granular metal oxide-based nanoparticles in the longitudinal direction, laminating and aggregating into a wire shape, exhibit porosity by including pores (or voids) formed between the metal oxide-based nanoparticles.

The pores included in the nanowires are specifically meso-sized pores, and have an average pore size of 5 to 20 nm, more specifically have an average pore size of 7 to 16 nm.

Further, the pores existing in the nanowires may be internetworked to adjacent pores to form a mesoporous pore network. The formation of such pore network provides much more active sites during the OER.

Furthermore, the pore volume in the nanowires including the pores may be 0.05 $cm^3g^{-1}$ or higher, more specifically 0.1 to 0.18 $cm^3g^{-1}$.

As the pores are included in a high content as described above, the nanowires exhibit an increased specific surface area. Specifically, the nanowire may have a BET specific surface area of 10 to 60 $m^2g^{-1}$, more specifically 30 to 50 $m^2g^{-1}$. As the nanowires have such increased specific surface area, they can exhibit a high catalytic activity.

Meanwhile, in the present invention, the pore size and the average pore distribution in the nanowires can be measured by a $N_2$ adsorption-desorption analysis at 77.3K, and the BET specific surface area can be measured by Brunauer-Emmett-Teller (BET, Tristar ll 3020 V1.03, Micromeritics, USA).

Further, the nanowire may have a diameter of about 200 to 300 nm, a length of 5 to 10 μm, and a ratio of length to diameter, that is, an aspect ratio of 10 to 50. By exhibiting such an aspect ratio, a more excellent catalytic activity can be exhibited.

Furthermore, since the nanowire is prepared by its unique preparation process, specifically by hydrothermal reaction, tapering occurs in which the width becomes thinner gradually towards the tip of the nanowire, that is, the tip of the nanowire opposite to the carbon fiber fabric, due to a decrease in the reactant concentration as the reaction progresses.

In addition, for the nanowires, the metal oxide may include any one or two or more metal elements selected from the group consisting of Li, Co, Ni, Zn, Fe, Ti, Na, Mn, Cu, Ga, Sn, Cr and W. Among them, considering that the nanowires exhibit more superior catalytic activity when used as a catalyst electrode for oxygen evolution, nickel and cobalt may be included.

As such nanowires grow three-dimensionally on the surface of the carbon fibers, they can have the widest specific surface area relative to volume, and as a result, the contact area with an electrolyte can be widened, thereby exhibiting more excellent catalytic activity during the OER.

Moreover, a carbon coating layer surrounding the nanowires is disposed on the outer surface of the nanowires. The carbon coating layer is a medium connecting the nanowires and the carbon fibers in the electrode current collector, and forms a conductive network between the nanowires and the carbon fibers, thereby improving electron transfer.

In the case of a three-dimensional catalyst electrode which is used by preparing a nano structure having a carbon nanotube as a backbone in a current collector of an electrode of a conventional carbon paper, as compared with a catalyst electrode in which an connection relation between the current collector of the electrode and the catalytic material is prepared in the form of a built-in electron conductor, the present invention can reduce the contact resistance by forming a carbon coating layer composed of the same kind of element as the carbon fiber fabric for a relatively inexpensive metal oxide-based three-dimensional nanowire, and also can promote electron transfer by forming an electron passage through which the electrons in the carbon fiber fabric used as the electron current collector and the carbon coating layer on the outer surface of the nanowires can move continuously and rapidly, thereby exhibiting more excellent catalytic activity. Specifically, the catalyst electrode for oxygen evolution according to one embodiment of the present invention comprises an electrode current collector including a carbon fiber fabric; a nanowire layer including a metal oxide-based porous nanowire grown radially from the surface of the carbon fiber; and a porous carbon coating layer disposed around the outer surface of the nanowire, wherein the carbon fiber fabric and the carbon coating layer are internetworked to form a continuous electron transfer passage.

Further, the carbon coating layer includes pores, more specifically mesopores, in the carbon coating layer due to gases such as $H_2O$ or $CO_2$ generated during the preparation process such as thermal decomposition of a precursor for forming a nanowire. Specifically, unlike conventional nanowires formed by anodizing or vapor deposition, the nanowires of the present invention are prepared by forming a precursor in the form of a nanowire by hydrothermal reaction, followed by thermally decomposing the precursor. Herein, gases such as $H_2O$ or $CO_2$ are generated, and due to the generated gases, pores can be formed in the carbon coating layer formed on the nanowires and their surfaces. The oxygen-evolving electrode according to the present invention includes the pores in the carbon coating layer as described above, thereby further increasing the specific surface area of the catalyst electrode, and consequently improving the catalytic activity.

The pores formed in the carbon coating layer have a pore diameter smaller than the pores existing in the nanowires, and specifically, the average pore diameter may be 4 to 5 nm.

Further, the pores existing in the carbon coating layer may be internetworked to adjacent pores and further to the pores existing in the nanowires to form a mesoporous pore network over the entire nanowires having the carbon coating layer formed thereon. Specifically, the catalyst electrode for oxygen evolution according to one embodiment of the present invention includes an electrode current collector including a carbon fiber fabric; a nanowire layer including a metal oxide-based porous nanowire grown radially from the surface of the carbon fiber; and a porous carbon coating layer disposed around the outer surface of the nanowire, and further includes a mesoporous pore network formed by an internetworking of the pores included in the nanowires and the carbon coating layer. This internetworking of the pores not only in the nanowires but also in the outer carbon coating layer provides much more active sites during the OER and further enhances the accessibility of the electrolytes to the active site, thereby exhibiting further improved catalytic activity.

The porous carbon coating layer may have an average thickness of 1 to 5 nm, more specifically 2 to 4 nm. If the thickness of the carbon coating layer is exceedingly thick, departing from the above-mentioned range, the physical distance between the nanowires and the carbon coating layer increases, whereby the possibility of contact between the nanowires and water may be reduced and so the OER performance may be rather decreased. However, when the carbon coating layer is formed in the thickness range described above, it can exhibit excellent conductivity without such concerns.

Further, in a conventional method of forming a carbon coating layer by annealing glucose or the like, a functional group, specifically, a hydrophilic group is not formed on the carbon coating layer, but in the present invention, a hydrophilic group may be formed on the surface of the carbon coating layer by performing a hydrothermal carbonization process before the annealing of a precursor material for forming a carbon coating layer, such as glucose or the like.

That is, the carbon coating layer may further include a hydrophilic group such as a hydroxyl group, an epoxy group, a carboxyl group and the like formed by hydrothermal carbonization of a precursor material for forming a carbon coating layer such as glucose or the like. Specifically, the catalyst electrode for oxygen evolution according to one embodiment of the present invention includes an electrode current collector including a carbon fiber fabric; a nanowire layer including a metal oxide-based porous nanowire grown radially from the surface of the carbon fiber; and a porous carbon coating layer disposed around the outer surface of the nanowire, and further includes a mesoporous pore network formed by an internetworking of the pores included in the nanowires and the carbon coating layer, wherein the porous carbon coating layer includes a hydrophilic group. As such, the hydrophilic group existing on the surface of the carbon coating layer enhances the electrolyte wettability at the surface of the nanowires, thereby exposing more active sites, and thus rendering these surfaces to be more favorable for water oxidation.

The nanowires having the porous carbon coating layer formed thereon may have a significantly increased BET specific surface area by including the pores in the both regions of the inner nanowires and the carbon coating layer. Specifically, the nanowires having the porous carbon coating layer formed thereon may have an average pore size of 5 to 15 nm, a pore volume of 0.15 $cm^3g^{-1}$ or higher, and a BET specific surface area of 40 $m^2g^{-1}$ or higher. More specifically, they may have an average pore size of 5 to 05 nm, a pore volume of 0.15 or 0.29 $cm^3g^{-1}$, and a BET specific surface area of 50 to 70 $m^2g^{-1}$. By including these small pores in a high content, and thereby exhibiting an increased BET specific surface area, it is possible to exhibit more excellent catalytic activity during the OER.

Further, the nanowires having the porous carbon coating layer formed thereon may have two pore size distributions in the range of 4.0 to 5.0 nm and in the range of 10 to 40 nm due to the size difference between the pores formed in the nanowires and the pores formed in the carbon coating layer.

Furthermore, the nanowires having the porous carbon coating layer formed thereon may have a diameter of about 200 to 300 nm, a length of 5 to 10 μm, and a ratio of length to diameter, that is, an aspect ratio of 10 to 50. By exhibiting such an aspect ratio, a more excellent catalytic activity can be exhibited.

In the present invention, the length of the nanowires on which the porous carbon coating layer is formed refers to the length from the attachment point with the surface of the carbon fibers to the end of the nanowires (including the carbon coating layer), while passing through the center of the nanowires. The diameter of the nanowires is perpendicular to the above length and refers to the length of a major axis of the cross-section passing through the center of the nanowires.

Meanwhile, the porous carbon coating layer may be formed on the surface of the electrode current collector, specifically, on the surface of the electrode current collector on which nanowires are not formed.

Accordingly, the catalyst electrode for oxygen evolution according to one embodiment of the present invention further includes a second carbon coating layer disposed on the electrode current collector, wherein the second carbon coating layer may exist as being continuously connected to the carbon coating layer surrounding the surface of nanowires. When the carbon coating layer is also formed on the surface of the electrode current collector as described above, a passage for electron transfer is formed over the entire catalyst electrode, thereby enabling the transfer at a much higher speed. In addition, the second carbon coating layer may also be porous including mesopores similarly to the carbon coating layer formed on the outer surface of the nanowires.

Meanwhile, the catalyst electrode having the structure described above according to one embodiment of the present invention may be prepared by a preparation method including the steps of: forming a precursor nanowire for forming a metal oxide-based nanowire on an electrode current collector including a carbon fiber fabric through a hydrothermal reaction in a precursor solution for forming a metal oxide-based nanowire (Step 1), and coating the surface of the precursor nanowire for forming a metal oxide-based nanowire using a precursor solution for forming a carbon coating layer, followed by subjecting it to hydrothermal carbonization at 120 to 200° C., and then annealing at 250 to 800° C. (Step 2). Accordingly, according to another embodiment of the present invention, there is provided a method for preparing the catalyst electrode.

FIG. 1 is a schematic diagram showing the process for preparing the catalyst electrode for oxygen evolution according to one embodiment of the present invention. Hereinafter, the method for preparing the catalyst electrode will be described in detail for each step, with reference to FIG. 1.

(Step 1)

Step 1 for preparing the catalyst electrode according to one embodiment of the present invention is a step (S1) for forming a precursor nanowire (b) on an electrode current collector (a).

The formation of the nanowire layer may be specifically performed by immersing the electrode current collector including the carbon fiber fabric in a precursor solution for forming a metal oxide-based nanowire, and then subjecting it to a hydrothermal reaction.

The formation of nanowires for the metal oxide precursor by the hydrothermal reaction has high industrial applicability because the preparation method is more simpler and safer, while exhibiting a catalytic activity in an equivalent or higher level compared to the conventional method of preparing an electrode by growing carbon nanotubes by vapor deposition such as a conventional CVD or the like.

The electrode current collector is the same as described above. However, the electrode current collector may be selectively pretreated, prior to the hydrothermal reaction for the formation of nanowires, for the purpose of removing impurities or forming surface functional groups or defects for promoting nucleation for forming nanowires.

Specifically, the pretreatment may be performed by immersing the carbon fiber fabric in a washing solvent, such as distilled water, ethanol, acetone or hydrochloric acid, and then subjecting it to ultrasonic treatment for 5 to 20 minutes. More specifically, it may be performed by immersing the fabric in ethanol and distilled water in sequence and then subjecting it to ultrasonic treatment 5 to 20 minutes. An oxygen-containing functional group may be formed on the surface of the carbon fiber fabric by the ultrasonic treatment, and the oxygen-containing functional groups may provide nucleation sites.

Further, the precursor solution for forming a metal oxide-based nanowire may be prepared by dissolving a precursor of a metal oxide for forming a nanowire with water such as distilled water; alcohols such as ethanol; or a mixed solvent thereof. Specifically, the precursor solution can be prepared by dissolving in distilled water. At this time, at least one of surfactants; and basic materials such as urea may be further added to the precursor solution for forming a metal oxide-based nanowire, if necessary.

Specifically, the precursor for forming a metal oxide-based nanowire may be a chloride, an acetate, a nitrate, a hydrate or a hydroxide, etc. including at least one metal, wherein the metal may be selected from the group consisting of Li, Co, Ni, Zn, Fe, Ti, Na, Mn, Cu, Ga, Sn, Cr and W. If the nanowires in the catalyst electrode to be finally prepared include different kinds of metal oxides, different precursors each including different metals may be used as the precursor for forming a metal oxide-based nanowire. By way of example, if the nanowires include oxides of Co and Ni, a Co raw material and a Ni raw material may be used. Specifically, the Co raw material may be a chloride, an acetate, a hydrate or a hydroxide, etc., including Co, among which a chloride ($CoCl_2$) may be used. In addition, the Ni raw material may be a chloride, an acetate, a hydrate or a hydroxide, etc., including Ni, among which a chloride ($NiCl_2$) may be used.

Further, the precursor solution for forming a metal oxide-based nanowire may further include a surfactant together with the precursor for forming a metal oxide-based nanowire described above.

The surfactant serves as a soft template for forming nanowires of uniform size. Specifically, it may include quaternary ammonium salts such as hexadecyl trimethyl ammonium bromide, alkyl trimethyl ammonium salts, dialkyl dimethyl ammonium chloride, benzalkonium chloride and the like; or various cationic surfactants such as alkylpyridinium salts, higher amine halide compounds and the like, among which a mixture of one or more thereof may be used. The surfactant may be added in a molar ratio of 0.1 to 1 mole, more specifically 0.3 to 0.5 mole, based on 1 mole of the precursor for forming a metal oxide-based nanowire. If the content of the surfactant is less than 0.1 mole, the size of the nanowires to be produced may be small. If the content of the surfactant exceeds 1 mole, side reactions may occur.

Furthermore, the precursor solution for forming a metal oxide-based nanowire may further include a basic material such as urea, sodium hydroxide (NaOH), potassium hydroxide (KOH), barium hydroxide ($Ba(OH)_2$), aqueous ammonia ($NH_4OH$) and the like.

When the basic material is, for example, urea, it is hydrolyzed according to a temperature increase during the hydrothermal synthesis reaction, and anions of $CO_3^{2-}$ and $OH^-$ in the aqueous solution are released.

The basic material may be added in a molar ratio of 1 to 2 moles, more specifically 1.2 to 1.5 moles, per 1 mole of the precursor for forming a metal oxide-based nanowire.

After the precursor solution for forming a metal oxide-based nanowire is prepared in the same manner as described above, the carbon fiber fabric is immersed.

The immersion may be performed for 5 hours or more, more specifically 7 hours or more, so that the precursor solution can be sufficiently permeated into the carbon fiber fabric. If the immersion time is less than 5 hours, there may be a portion where the nanowires are not grown in the carbon fiber fabric. In addition, the immersion may be carried out for 30 hours or less, specifically 20 hours or less in terms of improving the overall process efficiency.

Further, the hydrothermal reaction after the immersion may be carried out at a temperature of 90 to 180° C., more specifically, at a temperature of 100 to 150° C. for 3 to 15 hours, more specifically for 7 to 10 hours. In the case of deviating from the hydrothermal reaction condition, it may grow out of the shape of nanowires and grow in the state of particle agglomerates or may not have a length in a micrometer scale even if they grow. Specifically, when the temperature is lower than 90° C. during the hydrothermal reaction, the particles to be grown into metal oxide nanowires may not form a condensation nucleus. Further, if the temperature exceeds 180° C., the temperature may be higher than the boiling point of the solvent, and thus the solvent may possibly evaporate. Furthermore, when the hydrothermal reaction is performed for less than 3 hours, the growth into the nanowires is not sufficient. In terms of the overall process efficiency, the reaction may be performed for 15 hours or less, more specifically 10 hours or less.

As the hydrothermal reaction proceeds under the above-mentioned conditions, anions of $CO_3^{2-}$ and $OH^-$ are released by the hydrolysis of a raw material anion, for example, urea. At the same time, the metal cations derived from the precursor for forming a metal oxide-based nanowire, such as $Ni^{2+}$ and $Co^{2+}$, interact with the anions to form metal oxide precursor nanowires. In addition, the carbon fiber fabric impregnated in the precursor solution for forming a metal oxide-based nanowire, particularly the carbon fiber fabric having oxygen-containing functional groups and surface defects through an ultrasonic treatment, may serve as a nucleation site for a crystal seed of the precursor for forming a metal oxide-based nanowire (hereinafter, simply referred to as "precursor"). Accordingly, after the precursor seeds are fixed to the surface of the carbon fiber, they grow, and the surface free energy decreases. In the initial stage, the surfactant serves as a soft template and is attached to the optimal position of the precursor seeds, and prevents access of the metal ions from the seed surface. As a result, the adsorption surface of the surfactant is inactivated, and the growth proceeds on the other surface. As a result of the hydrothermal reaction as described above, precursor nanowires grow radially from the surface of the carbon fiber of the electrode current collector.

After completion of the growth of the precursor nanowires, there may exist precursor particles of the metal oxide, which have been loosely adhered to the surface of the electrode collector surface, and these precursor particles of the metal oxide may increase the contact resistance in the catalyst electrode to be finally prepared, and thus, the removal process for such metal oxide precursor particles may be further performed prior to performing the subsequent step, if necessary.

Specifically, the removal process of the metal oxide precursor particles may be performed by an ultrasonic treatment. More specifically, it may be performed by immersing in distilled water the electrode current collector in which the nanowires are grown as a result of the hydrothermal reaction, and then subjecting it to ultrasonic treatment.

Further, after completion of the hydrothermal reaction or after the ultrasonic treatment, a drying process for removing the residual solvent from the electrode current collector on which the nanowires are grown may be further performed.

The drying process may be carried out by a conventional method such as natural drying, hot air drying, heat drying and the like. Specifically, it may be performed by heat drying at 40 to 70° C. As a result of Step 1, the precursor nanowires (b) are prepared radially from the surface of the carbon fibers on the electrode current collector of the carbon fiber fabric (a).

(Step 2)

Next, Step 2 for preparing the catalyst electrode according to one embodiment of the present invention is a step (S2) for forming a carbon coating layer for the precursor nanowires (b), followed by forming a metal oxide-based porous nanowire (c) surrounded by the carbon coating layer via annealing.

The formation of the carbon coating layer may be specifically performed by coating the surface of the precursor nanowires using a precursor solution for forming a carbon coating layer, and then subjecting it to hydrothermal carbonization at 120 to 200° C.

In this case, the precursor solution for forming a carbon coating layer may be prepared by dissolving a precursor for forming a carbon coating layer in a solvent, wherein an organic compound such as glucose or the like may be used as the precursor for forming a carbon coating layer. In addition, the solvent is not particularly limited as long as it can dissolve the precursor for forming a carbon coating layer, and specific examples thereof include water or the like.

Further, the precursor for forming a carbon coating layer may be contained at a concentration of 0.1 to 1.0M in the precursor solution.

Furthermore, the coating of the precursor solution for forming a carbon coating layer for the precursor nanowire may be performed by a conventional slurry coating method such as spraying, immersion or coating, etc. Among them, the coating can be performed by immersion in consideration of the effect of forming a uniform carbon coating layer for the precursor nanowires.

In addition, after the coating process, hydrothermal carbonization may be performed at 120 to 200° C. If the temperature during the hydrothermal carbonization is less than 120° C., sufficient carbonization is not performed, and the remaining precursor materials may act as resistance, thereby decreasing the conductivity in the carbon coating layer. If the temperature during the hydrothermal carbonization exceeds 200° C., the rate of the hydrothermal carbonization reaction may not be easily controlled and thus uniform carbonization may not occur. Considering the hydrothermal carbonization efficiency or the like, the hydrothermal carbonization can be carried out at a temperature of 150 to 180° C.

By the hydrothermal carbonization as described above, the carbon coating layer is formed while surrounding the precursor nanowires. Specifically, under the condition of hydrothermal carbonization, the glucose molecules are decomposed by dehydration, and are crosslinked while surrounding the entire surface of the nanowires. Specifically, the glucose molecules become a carbonated layer having many functional groups. Herein, the precursor nanowires serve as nucleation and growth sites for the carbonization of glucose.

After the hydrothermal carbonization as described above, a removal process for removing impurity particles loosely adhered to the surface of the carbon fiber fabric may be further performed if necessary. The removal process may be performed by an ultrasonic treatment as described above.

Subsequently, an annealing process is performed on the precursor nanowires coated with the precursor for forming a carbon coating layer.

The annealing process may be performed by a high-temperature heat treatment, and more specifically, it may be performed by a heat treatment at 250 to 800° C. under an atmosphere of inert gases such as nitrogen, argon and the like. The heating rate during the heat treatment may be 2 to 5° C. per minute.

By the annealing process under the inert gas atmosphere, the precursor nanowires are thermally decomposed and converted into a crystal structure. The grain nanoparticles included in the precursor nanowires contract to form many voids, and as gases such as $H_2O$ and $CO_2$ are generated during the decomposition and oxidation of the intermediate compounds, the inside of the nanowires becomes porous. Further, a carbonization occurs in the carbon coating layer including the crosslinked products of glucose, wherein the carbon coating layer also becomes porous due to gases such as $H_2O$ and $CO_2$ generated during the decomposition of the precursor nanowires. Accordingly, when the annealing is performed at the heat treatment temperature and the heating rate, the thermal decomposition of the precursor nanowires is sufficiently achieved, making it possible to form metal oxide-based porous nanowires. Considering the efficiency of the formation of the metal oxide-based porous nanowires according to the control of the heat treatment condition during the annealing process, the annealing process may be more specifically performed by a heat treatment at 300 to 400° C. under an inert gas atmosphere, and the heating rate during the heat treatment may be 2 to 5° C. per minute, more specifically 3 to 4° C. per minute.

In addition, the time for the annealing process is not particularly limited, and may be a time sufficient to cause carbonization of the precursor for forming a coating layer under the above-described heat treatment condition. Specifically, it may be carried out under the above-mentioned heat treatment condition for 2 to 10 hours, more specifically for 2 to 3 hours.

The catalyst electrode prepared via the above-described preparation process can exhibit an excellent catalytic activity for the oxygen evolution reaction by including the metal oxide-based nanowires grown three-dimensionally on the electrode current collector including the carbon fiber fabric.

Figure 2:
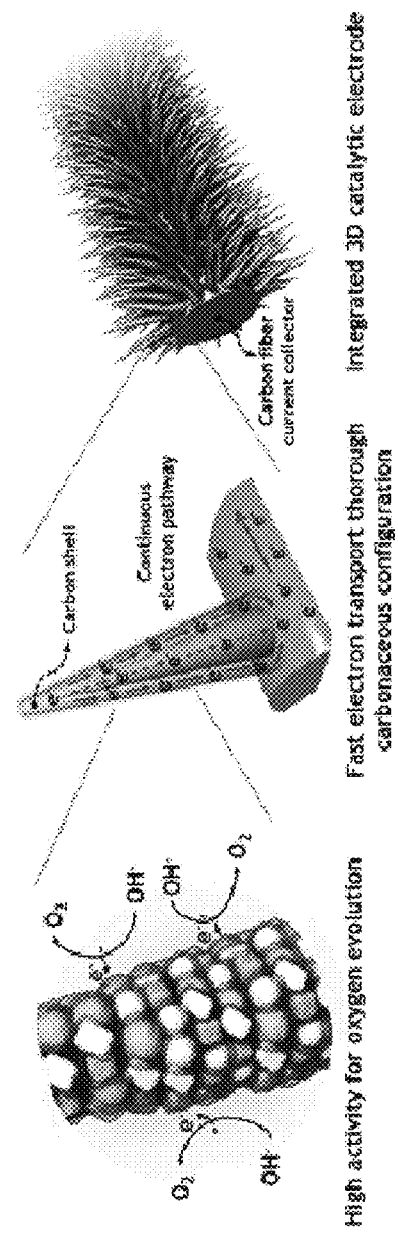
FIG. 2 is a schematic diagram showing the oxygen evolution mechanism in the catalyst electrode for oxygen evolution according to one embodiment of the present invention.

FIG. 2 is a schematic diagram showing the oxygen evolution mechanism in the catalyst electrode for the oxygen evolution according to one embodiment of the present invention. As shown in FIG. 2, the nanowires in the catalyst electrode according to the present invention can further promote the oxygen evolution reaction by providing increased contact area and active sites. Further, the carbon coating layer surrounding the electrode current collector and the outer surface of the metal oxide-based nanowire serves as a passage for electron transfer, enabling the electron transfer at a higher speed. Furthermore, as both the nanowires and the carbon coating layer surrounding the nanowires exhibit porosity, the specific surface area is increased, and the possibility of contact with the electrolytes increases, thereby exhibiting more excellent catalytic activity. Specifically, the catalyst electrode according to one embodiment of the present invention generates a current density value of 10 mA/cm$^2$ and thus requires an overpotential value of 302 mV (Tafel slope 43.6 mV/dec).

Accordingly, the catalyst electrode according to one embodiment of the present invention may be useful as a catalyst electrode for oxygen evolution in a hydrogen energy source device such as a fuel cell or the like which requires hydrogen production through electrolysis of water.

Therefore, according to still another embodiment of the present invention, there is provided a hydrogen energy source device including the catalyst electrode, specifically a fuel cell.

The hydrogen energy source device and the fuel cell have a general structure, except that the above-mentioned catalyst electrode is included as an anode electrode, and thus a detailed description thereof will be omitted.

Hereinafter, the action and effect of the present invention will be described in detail by way of specific Examples. However, these Examples are given for illustrative purposes only, and the scope of the invention is not intended to be limited by these Examples.

Example 1

Preparation of Electrode Current Collector

A carbon fiber fabric (Plain Carbon Cloth, Model: 1071, manufactured by Fuel Cells Etc) was cut into a rectangular shape of 3 cm×1 cm, and then immersed in ethanol and distilled water in sequence and ultrasonicated for about 10 minutes to prepare an electrode current collector. The carbon fiber fabric is a plain fabric having the following conditions:
Number of warp threads per unit cm (warp per cm)=19.3
Number of filaments (fill per cm)=18.5
Diameter of filament=7.5 μm
Density of filament=1.75~1.77 g/cm$^3$
Thickness of carbon fiber fabric=356 μm
Density of carbon fiber fabric=1.5 g/cm$^3$
Formation of Nanowire Layer A precursor solution for forming a metal oxide-based nanowire was prepared by adding $CoCl_2$:$NiCl_2$:hexadecyl trimethyl ammonium bromide:urea in a molar ratio of 2:1:1:4.5 to 50 ml of distilled water and then completely dissolving the mixture. The carbon fiber fabric prepared above was immersed in the prepared precursor solution for a forming metal oxide-based nanowire at room temperature (20±5° C.) for at least 7 hours. Subsequently, the precursor solution for forming a metal oxide-based nanowire, in which the carbon fabric was immersed, was transferred to a teflon-lined stainless-steel autoclave, and was maintained therein at 100° C. for 10 hours to form and grow Ni—Co precursor nanowires on the surface of the carbon fiber fabric. Thereafter, the carbon fiber fabric was taken out from the precursor solution for forming a metal oxide-based nanowire, placed into distilled water, and ultrasonicated to remove the particles loosely adhered to the surface of the carbon fiber fabric. After completion of the ultrasonic treatment, the carbon fabric was taken out and completely dried in an oven at 40° C.

Formation of Carbon Coating Layer and Preparation of Catalyst Electrode

After preparing a 0.15 M aqueous glucose solution, the carbon fiber fabric, on which the Ni—Co precursor nanowires were grown, was immersed therein. The aqueous glucose solution, in which the carbon fiber fabric was immersed, was placed in an oven at 180° C. for 3 hours to continue the reaction. After cooling the resultant to room temperature (20±5° C.), the carbon fiber fabric was taken out, placed into distilled water and ultrasonicated to remove the particles loosely adhered to the surface of the surface of the carbon fiber fabric.

Then, the carbon fabric coated with the glucose was subjected to thermal annealing at 300° C. for 2 hours under an argon (Ar) gas atmosphere to prepare a catalyst electrode. The heating rate during the heat treatment was 3° C. per minute.

Comparative Example 1

Preparation of Electrode Current Collector

The carbon fiber fabric as in Example 1 (Plain Carbon Cloth, Model: 1071, manufactured by Fuel Cells Etc) was cut into a rectangular shape of 3 cm×1 cm, and then immersed in ethanol and distilled water in sequence and ultrasonicated for about 10 minutes to prepare an electrode current collector.

Formation of Nanowire Layer

A precursor solution for forming a metal oxide-based nanowire was prepared by adding $CoCl_2$:$NiCl_2$:hexadecyl trimethyl ammonium bromide:urea in a molar ratio of 2:1:1:4.5 to 50 ml of distilled water and then completely dissolving the mixture. The carbon fiber fabric prepared above was immersed in the prepared precursor solution for forming metal oxide-based nanowires at room temperature (20±5° C.) for at least 7 hours. Subsequently, the precursor solution for a forming metal oxide-based nanowire, in which the carbon fabric was immersed, was transferred to a teflon-lined stainless-steel autoclave, and was maintained therein at 100° C. for 10 hours to form and grow Ni—Co precursor nanowires on the surface of the carbon fiber fabric. Thereafter, the carbon fiber fabric was taken out from the precursor solution for forming a metal oxide-based nanowire, placed into distilled water, and ultrasonicated to remove the particles loosely adhered to the surface of the carbon fiber fabric. After completion of the ultrasonic treatment, the carbon fabric was taken out and completely dried in an oven at 40° C.

Preparation of Catalyst Electrode

The carbon fiber fabric, on which the Ni—Co precursor nanowires prepared above were grown, was subjected to thermal annealing at 300° C. for 2 hours under an argon (Ar) gas atmosphere to prepare a catalyst electrode on which the Ni—Co nanowires were grown. The heating rate during the heat treatment was 3° C. per minute.

Experimental Example 1

The catalyst electrode prepared in Example 1 was observed at various magnifications under a scanning electron microscope (SEM), a high-resolution scanning electron microscopy (HRSEM) (Magellan-400, Nova230, Japan) and a transmission electron microscope (TEM) (Tecnai F20, USA and Titan cubed G2 60-300), and the results are shown in FIGS. 3 to 6, respectively.

Figure 3:
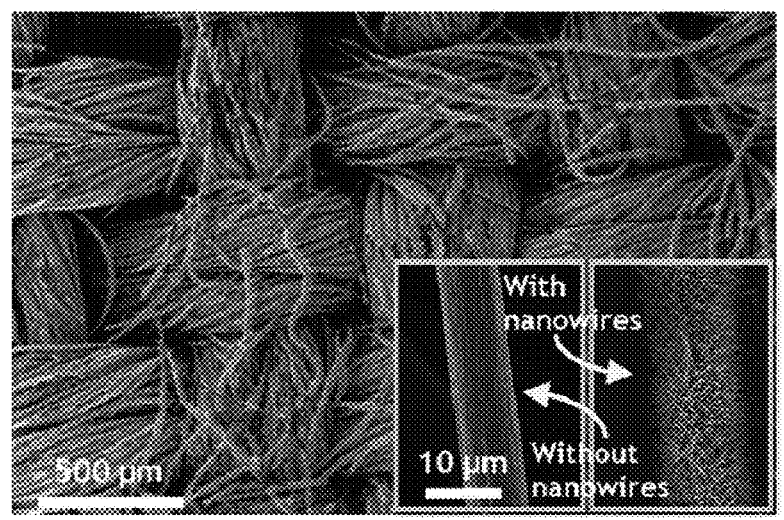
FIG. 3 is an image of the catalyst electrode prepared in Example 1 observed at a low magnification under a scanning electron microscope (SEM).

FIG. 3 is an image of the catalyst electrode prepared in Example 1 observed at a low magnification under SEM. In FIG. 3, the inset was observed by SEM before and after the formation of the nanowires.

Figure 4A:
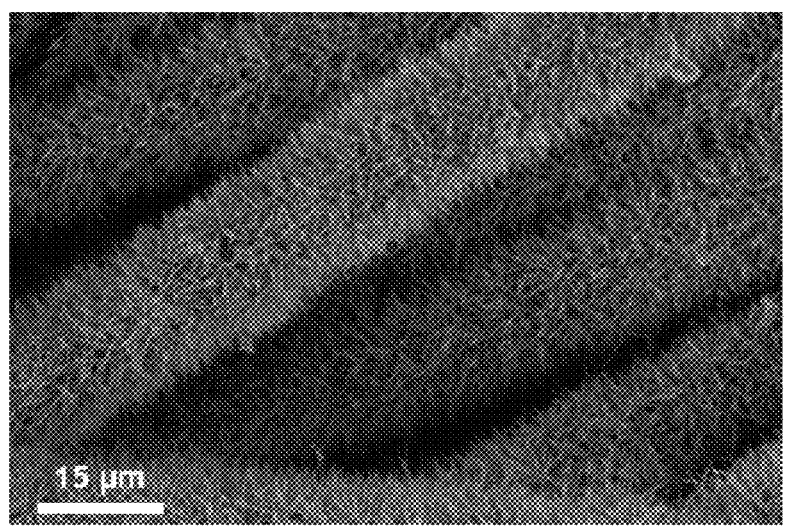
FIG. 4A is an image of the catalyst electrode prepared in Example 1 observed at a high magnification using SEM.
Figure 4B:
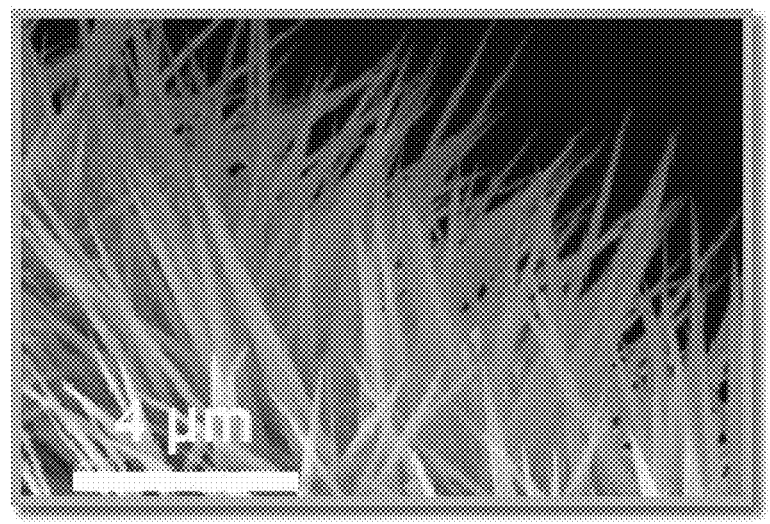
FIG. 4B is an image showing only nanowires (CCS Ni—Co Nws) having a carbon coating layer formed thereon, observed at a high magnification.

Further, FIG. 4A is an image of the catalyst electrode prepared in Example 1 observed at a high magnification under SEM, and FIG. 4B is an image showing only the nanowires having the carbon coating layer formed thereon, observed at a high magnification.

As shown in FIG. 3, the nanowires grown on the carbon fiber fabric can be identified. From the inset of FIG. 3, the difference between the case where Ni—Co Nws having the carbon coating layer formed thereon in the form of a core-shell structure are present on the carbon fiber (hereinafter, simply referred to as CCS Ni—Co Nws) and the case where the Ni—Co Nws are not present can be clearly confirmed.

Further, as shown in FIG. 4A, it can be confirmed that the nanowires radially grown on the surface of the carbon fiber in the finally prepared catalyst electrode are uniformly and densely distributed. The outer diameter of the pristine carbon fiber was about 7 to 9 μm, but the outer diameter of the nanostructured carbon fibers having the carbon coating layer formed thereon after the growth of the nanowires was 25 μm. The grown CCS Ni—Co Nws had a diameter of about 200 to 300 nm and a length of 5 to 10 μm, exhibiting a high aspect ratio. Furthermore, as shown in FIG. 4B, at the end of the nanowires, tapering was observed which occurred due to a decrease in the reactant concentration during the hydrothermal reaction.

Figure 5A:
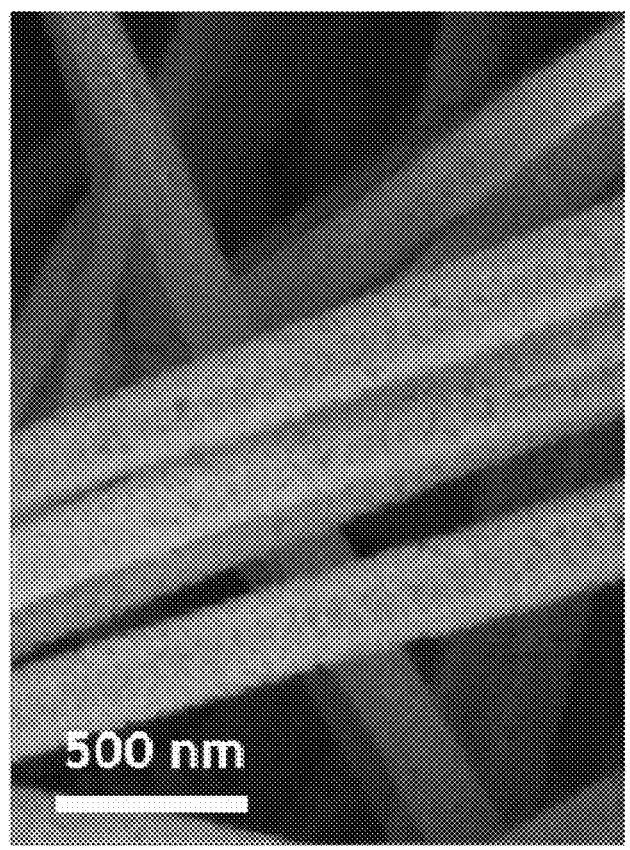
FIG. 5A is an image of Ni—Co nanowires (Ni—Co Nws) on the catalyst electrode prepared in Comparative Example 1 observed under a high-resolution scanning electron microscopy (HRSEM)
Figure 5B:
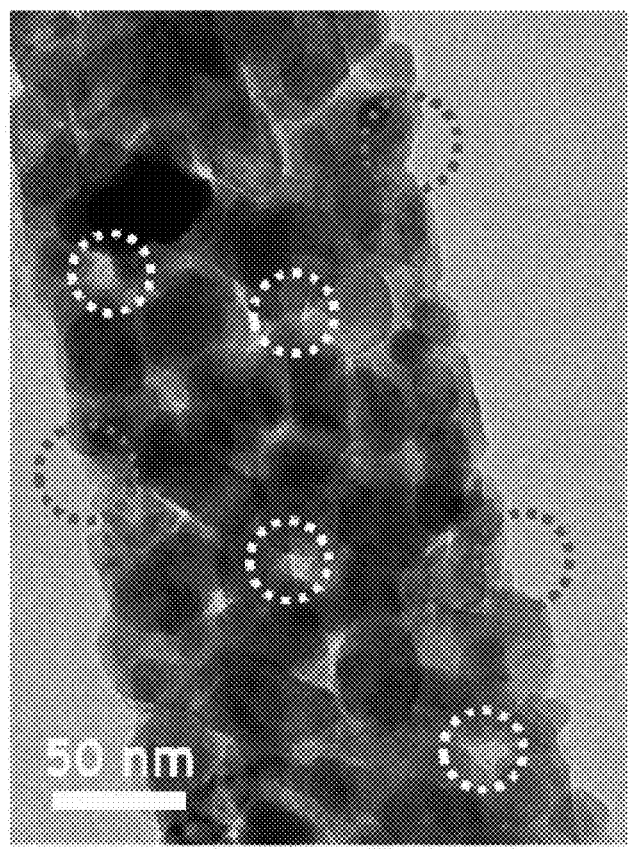
FIG. 5B is an image thereof observed under a transmission electron microscopy (TEM).

In addition, FIG. 5A is an image of Ni—Co nanowires (hereinafter, simply referred to as Ni—Co Nws) in the catalyst electrode prepared in Comparative Example 1 observed under a high-resolution scanning electron microscopy (HRSEM), and FIG. 5B is an image thereof observed under a transmission electron microscopy (TEM).

Figure 6A:
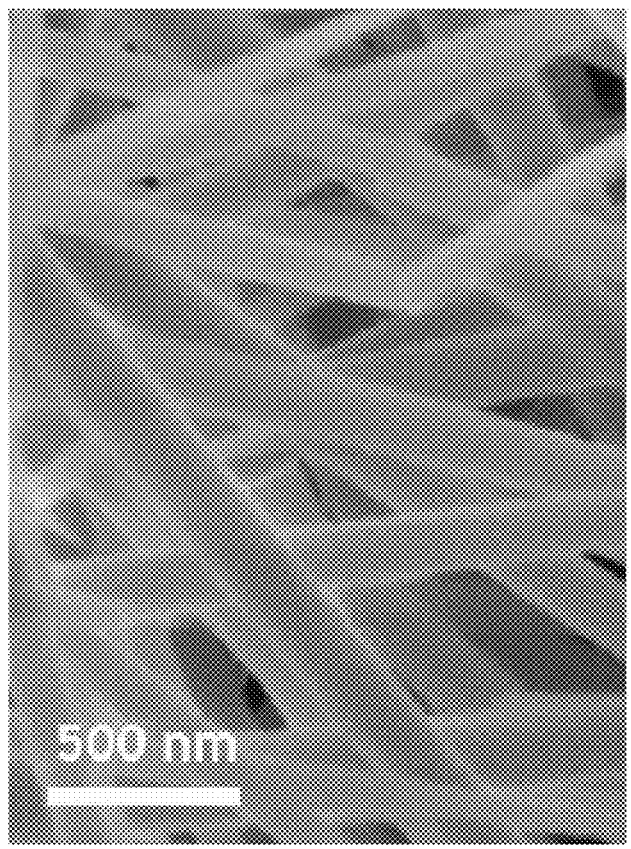
FIG. 6A is an image of Ni—Co nanowires (CCS Ni—Co Nws) having a carbon coating layer formed thereon in the catalyst electrode prepared in Example 1 observed under HRSEM.
Figure 6B:
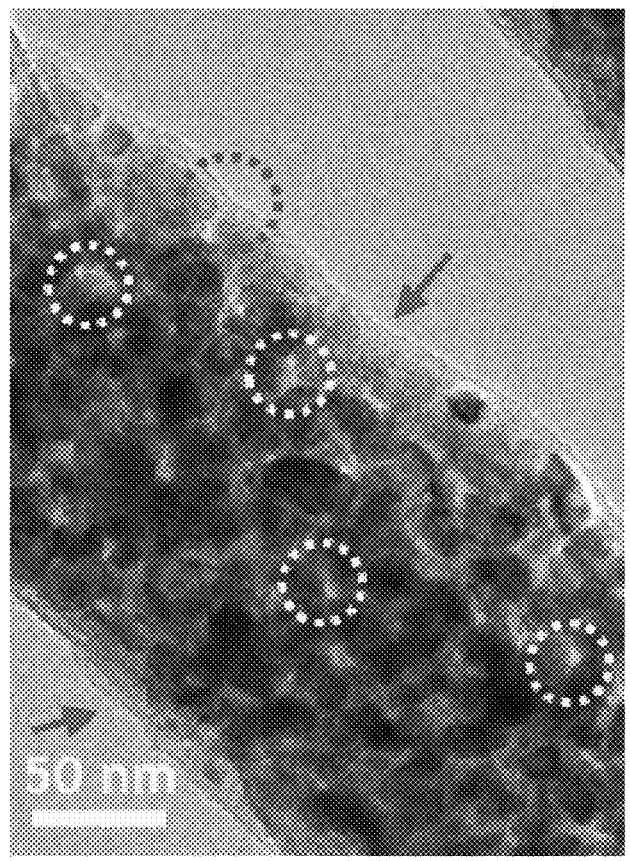
FIG. 6B is an image thereof observed under a transmission electron microscopy (TEM).

FIG. 6A is an image of Ni—Co nanowires (CCS Ni—Co Nws) having a carbon coating layer formed thereon after the annealing process, in the catalyst electrode prepared in Example 1 observed under HRSEM, and FIG. 6B is an image thereof under observed TEM.

As shown in FIGS. 5a and 5b, the Ni—Co Nw in the catalyst electrode prepared in Comparative Example 1 exhibited a rugged nanowire structure consisting of a large number of nanoparticles. Each of the nanoparticles in the Ni—Co Nw exhibited a wide particle size distribution ranging from several nanometers to several tens of nanometers and exhibited a round polygonal shape. In addition, as shown in FIG. 5B, it can be confirmed that these nanoparticles are continuously aggregated in the longitudinal direction to form nanowires. The Ni—Co precursor nanowires are thermally decomposed during the subsequent annealing process and release $CO_2$ and $H_2O$ gases. Herein, the pores in the nanowires are internetworked to form a mesoporous pore network (see white circles in FIG. 5B)

As shown in FIG. 6A, for the CCS Ni—Co Nws in the catalyst electrode finally prepared in Example 1, the smoother the surface of the Ni—Co Nw was, the carbon coating layer was formed more quickly, and the inherent smoothness was maintained. Further, a rough mesoporous structure was observed inside the carbon coating layer. This structure is similar to that of the Ni—Co Nws. Furthermore, as shown in FIG. 6B, the carbon coating layer was clearly seen on the outer surface of the nanowires, and it was confirmed that the porous characteristics of the nanowires were effective from the presence of the internetworked pores in the carbon coating layer (see gray circles and arrows in FIG. 6B). This structure provides abundant active sites upon water oxidation.

Figure 7:
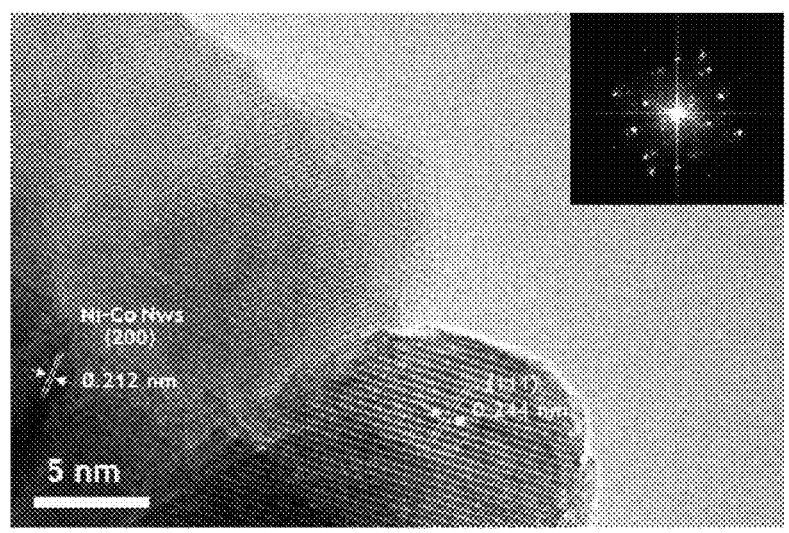
FIG. 7 is an image of Ni—Co nanowires in the catalyst electrode prepared in Comparative Example 1 observed under a high-resolution transmission electron microscopy (HRTEM), and the inset shows fast Fourier transform patterns thereof.
Figure 8:
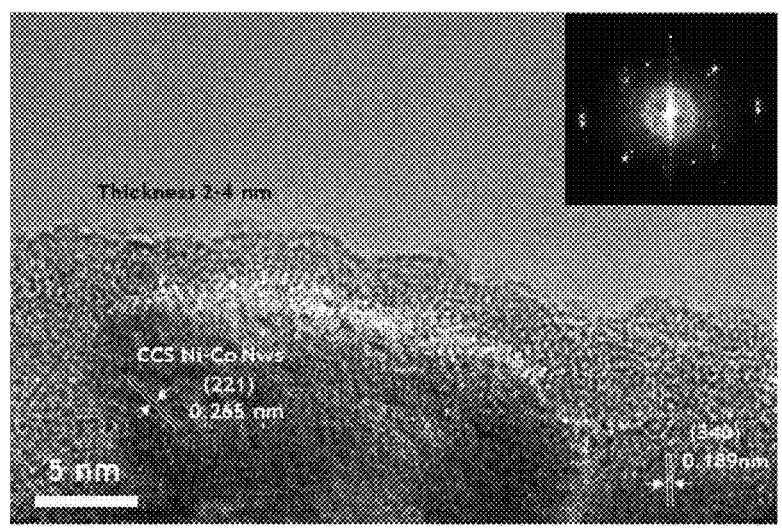
FIG. 8 is an image of CCS Ni—Co Nws in the catalyst electrode prepared in Example 1 observed under HRTEM, and the inset shows FFT patterns thereof.

During the preparation of the catalyst electrodes, the Ni—Co Nws and the CCS Ni—Co Nws can be clearly distinguished by annealing under an inert gas atmosphere. In order to evaluate the same, the Ni—Co Nws in the catalyst electrode according to Comparative Example 1 and the CCS Ni—Co Nws in the catalyst electrode according to Example 1 were observed at various magnifications under a high-resolution transmission electron microscopy (HRTEM). The results are shown in FIGS. 7 and 8, respectively. In addition, FFT patterns (fast Fourier transform patterns) for each nanowire were observed.

As shown in FIG. 7, the lattice spacings of the Ni—Co Nws in the catalyst electrode prepared in Comparative Example 1 were 0.212 nm and 0.244 nm. These spacings correspond to the (200) planes and (111) planes of Ni—Co oxide, respectively, and the formation of crystallized metal oxide nanowires can be confirmed therefrom. Meanwhile, as shown in FIG. 8, the lattice spacings of the CCS Ni—Co Nws in the catalyst electrode prepared in Example 1 were 0.265 nm and 0.189 nm, which correspond to the (221) planes and (340) planes of Ni—Co carbonate hydroxide, respectively. The difference in the crystal structures can be easily confirmed by comparing the FFT patterns (fast Fourier transform patterns) (see the inset).

Further, for the catalyst electrode prepared in Example 1, the carbon coating layer in the CCS Ni—Co Nws can be clearly distinguished by comparing with Ni—Co Nws, and the thickness of the carbon coating layer formed along the outer surface of the nanowires was 2 to 4 nm. The carbon coating layer is a medium for connecting the nanowires and the carbon fibers, and improves electron transfer and forms a conductive network between the carbon fibers and Ni—Co Nws.

Figure 9:
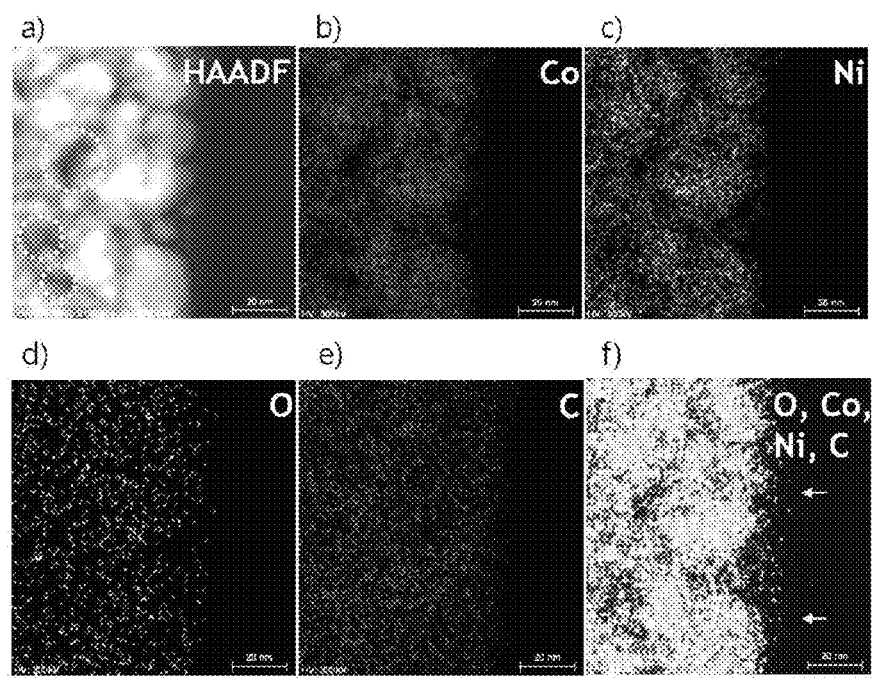
FIG. 9 is an image of the spatial distribution of elements in CCS Ni—Co Nw in the catalyst electrode prepared in Example 1 observed under a scanning transmission electron microscope (STEM).

Furthermore, the spatial distribution of the elements in the CCS Ni—Co Nw in the catalyst electrode according to Example 1 was observed under a scanning transmission electron microscopy (STEM), and the results are shown in FIG. 9.

In FIG. 9, a) is a high angle annular dark-field (HAADF) image showing the mapping regions, b) to e) are element mapping images for each element of Co, Ni, O and C, and f) is a composite image after a signal combination of b) to e).

As shown in FIG. 9, the elements of Ni, Co, O, and C are uniformly distributed throughout the nanowires. Among them, the element C is uniformly distributed throughout the entire nanowires, while the elements of Ni, Co, and O are positioned uniformly in the inner portion (core) of the nanowires.

Specifically, the position of the element Ni substantially coincides with that of the element Co, and it can be predicted therefrom that the nanoparticles include Ni—Co binary oxide phases (see b) and c) in FIG. 9). Further, the inner pores were easily observed where no Ni or Co element was present (see white circles in a) of FIG. 9, and only the elements of C and O were observed in the corresponding regions. Furthermore, the elements of C and O were only observed on the outer surface (shell) of the nanowires, and it can be confirmed therefrom that the carbon coating layer surrounding the nanowires was formed (see f) in FIG. 9).

Figure 10A:
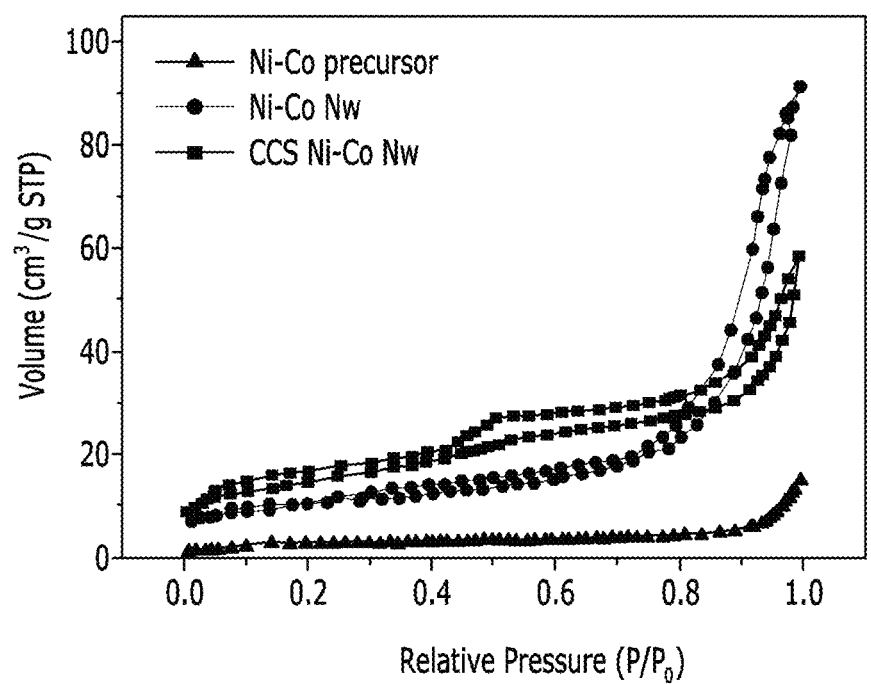
FIG. 10A is a graph showing nitrogen adsorption-desorption isotherms for Ni—Co precursor Nws (Ni—Co precursor) prepared in the process of preparing the catalyst electrode according to Example 1, CCS Ni—Co Nw in the finally prepared catalyst electrode, and Ni—Co Nws in the catalyst electrode according to Comparative Example 1.
Figure 10B:
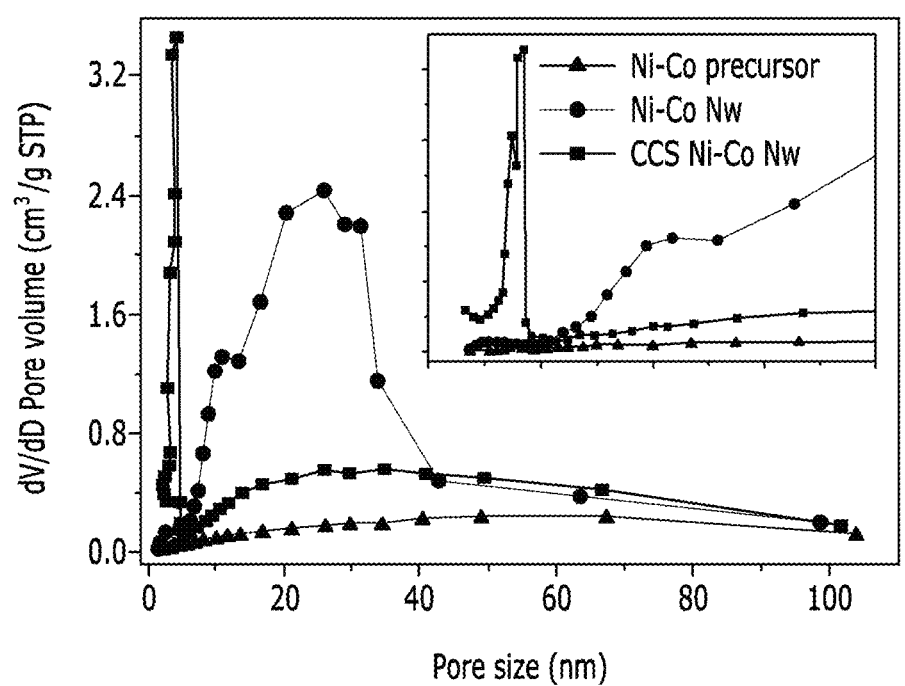
FIG. 10B is a graph showing the pore distribution curves thereof.

Additionally, in order to confirm the average pore size and pore volume of the Ni—Co precursor nanowires (Ni—Co precursor Nws) which were grown on the carbon fiber fabric immediately after the hydrothermal reaction, during the preparation of the catalyst electrode of Example 1, and the nanowires (CCS Ni—Co Nws) having the carbon coating layer formed thereon, which is finally prepared by glucose treatment on the Ni—Co precursor Nws, followed by annealing, a $N_2$ adsorption-desorption analysis was performed at 77.3 K. Further, the BET specific surface area was measured using Brunauer-Emmett-Teller (BET, Tristar ll 3020 V1.03, Micromeritics, USA). Furthermore, for comparison, the BET specific surface area, pore volume and average pore size of the Ni—Co nanowire were each measured in the same manner as described above during the preparation of the catalyst electrode according to Comparative Example 1. The results are shown in Table 1 below, and the corresponding nitrogen adsorption-desorption isotherms and pore distribution curves are shown in FIGS. 10a and 10b, respectively

TABLE 1

| | BET Specific Surface Area $[m^2g^{-1}]$ | Pore Volume $[cm^3g^{-1}]$ | Average Pore Size [nm] |
|---|---|---|---|
| Ni—Co precursor Nw | 8.16 | 0.0212 | 22.01 |
| Ni—Co Nw | 37.80 | 0.1409 | 15.65 |
| CCS Ni—Co Nw | 54.22 | 0.1919 | 6.34 |

The average pore diameter was determined from the desorption data and calculated from the isotherm using the Barrett-Joyner-Halenda (BJH) model.

As a result of the experiment, the Ni—Co precursor nanowire showed a specific surface area of 8.16 $m^2g^{-1}$, but after annealing, the specific surface area of the Ni—Co Nws increased significantly to 37.80 $m^2g^{-1}$. Such a rapid increase in the specific surface area was due to an increase in the number of pores according to the release of $CO_2$ and $H_2O$ during the annealing process, and the same results were also confirmed through field emission scanning electron microscopy (FESEM) and HRTEM analyses. In addition, after the formation of carbon coating layer and annealing, the specific surface area of the CCS Ni—Co Nws was increased to 54.22 $m^2g^{-1}$, which indicates that the carbon coating layer surrounding the nanowires is porous.

Further, as shown FIG. 10A, the isotherms for both Ni—Co Nws in the catalyst electrode according to Comparative Example 1 and CCS Ni—Co Nws in the catalyst electrode according to Example 1 exhibits the IV type isotherm (according to IUPAC). It can be confirmed therefrom that it has a mesoporous structure. Specifically, the isotherm for the Ni—Co Nws in the catalyst electrode according to Comparative Example 1 showed a slightly narrow H3-type hysteresis loop (at P/P0=0.8-1.0), and it can be implied therefrom that the mesopores indicate a broad pore size distribution. Meanwhile, the isotherm for the CCS Ni—Co Nws in the catalyst electrode according to Example 1 showed a clear H4-type hysteresis loop (at P/P0=0.45-1.0), and it can be confirmed that a mesoporous network in which neighboring pores having a much smaller size are internetworked.

Furthermore, as shown in FIG. 10B, the average pore diameter of the CCS Ni—Co Nws in the catalyst electrode according to Example 1 was 6.34 nm, which was smaller than that of the Ni—Co Nws in the catalyst electrode according to Comparative Example 1 (15.65 nm). In addition, a broad pore size distribution in the range of 10 to 40 nm was reduced in the CCS Ni—Co Nws, while a new narrow size distribution appeared at about 4.5 nm. It can be confirmed therefrom that a mesoporous carbon coating layer having much smaller pores was formed surrounding the nanowires, and it can be expected that the internetworking of the pores in the outer carbon coating layer can improve far more active sites and the accessibility of electrolytes to the active sites during in the OER.

Figure 11:
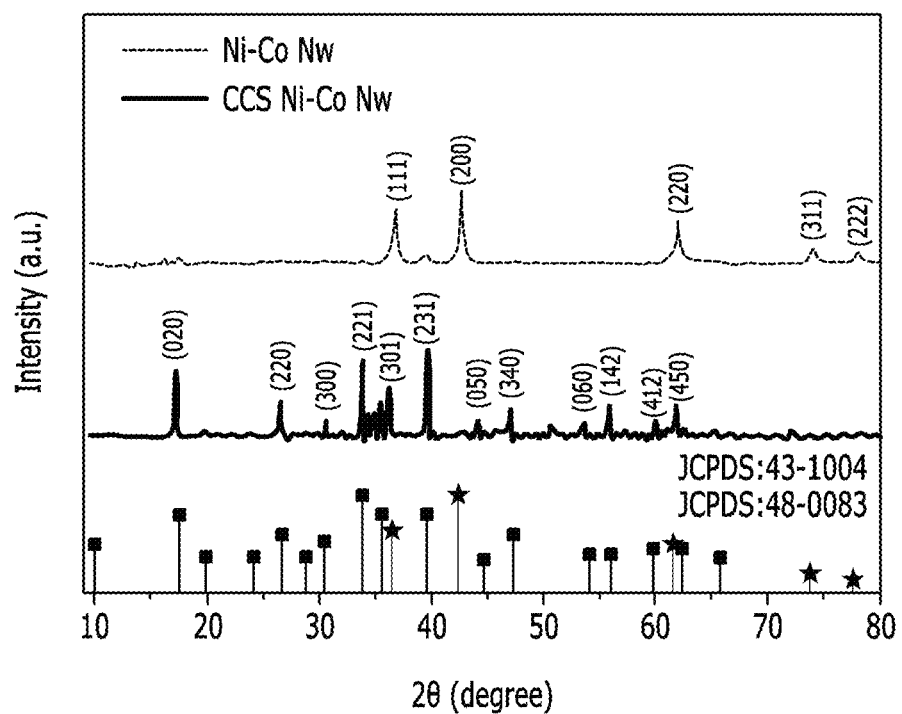
FIG. 11 is a graph showing the results of X-ray diffraction (XRD) of Ni—Co Nws in the catalyst electrode according to Comparative Example 1 and CCS Ni—Co Nws in the catalyst electrode according to Example 1.

Additionally, an X-ray diffraction analysis (XRD) (D/MAX-2500, Japan) was performed on the Ni—Co Nws in the catalyst electrode according to Comparative Example 1 and the CCS Ni—Co Nws in the catalyst electrode according to Example 1, and the results are shown in FIG. 11

As a result of the experiment, the CCS Ni—Co Nws in the catalyst electrode according to Example 1 exhibited an XRD pattern having a diffraction peak of 2θ at 17.2°, 26.4°, 30.6°, 33.8°, 36.2°, 39.5°, 44.2°, 47.1°, 53.7°, 55.8°, 59.9°, and 61.8°, and these correspond to crystal faces (020), (220), (300), (221), (301), (231), (050), (340), (060), (142), (412), and (450) of carbonate hydroxide such as $Co(CO_3)_{0.5}(OH)_{0.11}H_2O$ (JCPDS Card No. 48-0083), respectively. Further, all diffraction peaks were slightly shifted due to the formation of mixed Ni and Co carbonates and hydroxides, and a partial substitution of Co ions by Ni ions caused a slight change in the lattice parameter, but there was no change in the crystal structure. Furthermore, due to the characteristics of the thin amorphous carbon coating layer and the relatively strong peak of the metal carbonate hydroxide, the peaks related to carbon were not observed in the XRD patterns of the CCS Ni—Co Nws. Meanwhile, the Ni—Co Nws in the catalyst electrode according to Comparative Example 1 exhibited an XRD pattern having a diffraction peak of 2θ at 36.6°, 42.5°, 61.8°, 73.9, and 77.8° and these correspond to crystal faces (111), (200), (220), (311), and (222) of nanostructured CoO (JCPDS Card No. 43-1004), respectively. Except for a slight shift in the diffraction peaks, all diffraction peaks exhibited an XRD pattern similar to that of CoO. From this, a partial substitution of Co ions by Ni ions in the Ni—Co Nws can be confirmed. Unlike the CCS Ni—Co Nws, the Ni—Co carbonate hydroxide nanowires were decomposed into porous metal oxides. Along with this, $CO_2$ and $H_2O$ gases were released during the thermal annealing process.

Figure 12:
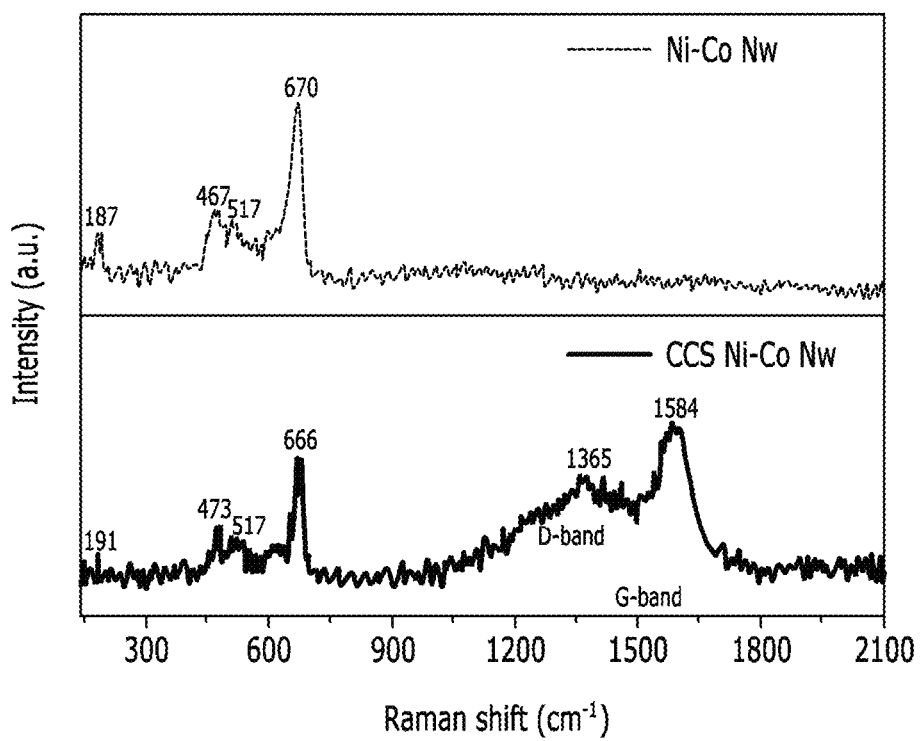
FIG. 12 is a graph showing the results of high-resolution dispersive Raman spectroscopy of Ni—Co Nws in the catalyst electrode according to Comparative Example 1 and CCS Ni—Co Nws in the catalyst electrode according to Example 1.

Additionally, the characteristics of the carbon coating layer surrounding the surface of nanowires were confirmed by Raman spectroscopy (LabRAM HR UV/Vis/NIR, France). The Raman spectra of the Ni—Co Nws in the catalyst electrode according to Comparative Example 1 and the CCS Ni—Co Nws in the catalyst electrode according to Example 1 are shown in FIG. 12

As a result of the experiment, the number of peaks at 700 $cm^{-1}$ or lower in both Ni—Co Nws and CCS Ni—Co Nws represent different types of Ni—Co. The characteristic peaks at 191 $cm^{-1}$ and 517 $cm^{-1}$ correspond to the $F_{2g}$ mode, and the peaks at 473 $cm^{-1}$ and 666 $cm^{-1}$ correspond to the $E_g$ and $A_{1g}$ modes respectively. The $A_{1g}$ mode is the characteristic of an octahedral site, and the $E_g$ mode is due to the mixed vibration of a tetrahedral site. The $F_{2g}$ mode corresponds to the octahedral oxygen motion and indicates that the crystal structure of the Ni—Co Nw partially changed to a spinel structure after the thermal annealing process. Further, the Raman spectrum of the CCS Ni—Co Nws exhibited two broad peaks corresponding to D-band and G-band at 1365 cm$^{-1}$ and 1584 cm$^{-1}$, respectively. The D-band represents a disorder according to the c-axis of a graphite-based carbon material, and the G-band corresponds to the stretching vibration of a sp$^2$ graphite-based carbon.

Furthermore, the ID/IG ratio in the CCS Ni—Co Nws is 0.76, which indicates a high contribution of the sp2-hybridized carbon in the porous carbon coating layer to the nanowires and exhibits excellent electrical conductivity between the nanowires and the carbon fibers.

In addition, the functional groups in the Ni—Co Nws in the catalyst electrode according to Comparative Example 1 and the CCS Ni—Co Nws at the catalyst electrode according to Example 1 were detected through Fourier transform infrared (FT-IR) spectroscopy (4100 Jasco, Japan) in the range of 4000 to 400 cm$^{-1}$.

As a result, both Ni—Co Nws and CCS Ni—Co Nws showed strong peaks at 3550 cm$^{-1}$ and 3508 cm$^{-1}$ due to the stretching vibrations of O—H groups in water molecule and hydrogen bonds in the O—H, indicating the presence of hydroxyl group ions in metal-OH layers or water molecules. In addition, the peaks at 1513 cm$^{-1}$ and 1488 cm$^{-1}$ represent $CO_3^{2-}$ ions, and the peaks at 434 cm$^{-1}$ and 431 cm$^{-1}$ represent a Co—OH bending vibration. Meanwhile, the peak showing at 2942 cm$^{-1}$ in the CCS Ni—Co Nws appears due to methylene stretching, and represents a $CH_2$ or CH group. Further, the peak at 1700 cm$^{-1}$ represents a carbonyl group and a carboxyl group (C=O vibration), and the peak at 1610 cm$^{-1}$ represents the skeletal structure of a sp$^2$ carbon (C=C vibration), indicating the carbonization of glucose during the hydrothermal reaction. Furthermore, the peaks in the range of 1000 to 1200 cm$^{-1}$ was attributed to the stretching of C—OH and the bending vibration of O—H, indicating the presence of a hydrophilic group in the carbon coating layer.

Hydrophilic groups derived from the carbonization of glucose play an important role in water oxidation, and they enhance electrolyte wettability at the surface of mesoporous materials, exposing more active sites. The hydroxylated functional groups generated in the carbon coating layer render these surfaces more favorable for water oxidation.

In addition, in order to confirm the electrical state and chemical composition on the surface of Ni—Co Nws in the catalyst electrode according to Comparative Example 1 and CCS Ni—Co Nws in the catalyst electrode according to Example 1, an X-ray photoelectron spectroscopy (XPS) (Sigma Probe, UK) was performed, and the results are shown in FIG. 13.

In FIG. 13, a) is survey spectra, and b) to d) are the results of high-resolution XPS analysis for Ni 2p, Co 2p and O 1s, respectively.

As a result of the analysis, the spectra of both Ni—Co Nws and CCS Ni—Co Nws show that the elements of Ni, Co, O, and C are the main components (see FIG. 13). Further, the high-resolution Ni 2p and Co 2p spectra exhibited $2p_{1/2}$ and $2p_{3/2}$ due to spin-orbit splitting, which implies that they contain quantitatively identical chemical information.

Furthermore, the high-intensity peaks of $2p_{3/2}$ and Co $2p_{3/2}$ including shake-up satellites were curve fitted. The high-resolution XPS spectrum of Ni $2p_{3/2}$ in the Ni—Co Nws showed major peaks distinguished from each other around 853.89 eV, 855.76 eV and the satellites, and these peaks appeared according to Ni$^{2+}$ and Ni$^{3+}$ oxidation states. In addition, the high-resolution XPS spectrum of Co $2p_{3/2}$ in the Ni—Co Nws showed major peaks around 779.43 eV, 781.29 eV, and the satellites, and these peaks were attributed to Co$^{3+}$ and Co$^{2+}$ oxidation states. Additionally, the O 1s spectrum of the Ni—Co Nws was deconvoled to three peaks after the fitting. The peak at 529.39 eV is related to oxygen in the metal oxide lattice, and is also related to the full complement of the nearest O$^{2-}$ ion. This is a strong evidence supporting the coexistence of NiO and CoO, and Ni$^{2+}$ and Co$^{2+}$ oxidation states. These results are consistent with the XRD analysis results.

The peak at 531.5 eV was attributed to the oxygen or hydroxyl group (OH) in the defect site in the oxygen crystal, and the peak at the same position may be attributed to the oxygen in oxyhydroxide (—OOH), which implies that the surface exposed Ni and Co are present in γ-NiOOH and γ-CoOOH phases and in the oxidation state of Ni$^{3+}$ and Co$^{3+}$, respectively.

The peak at 532.77 eV corresponds to physically absorbed or chemically absorbed water molecules on the surface. Similarly, the high-resolution XPS spectrum of Ni $2p_{3/2}$ in the CCS Ni—Co Nws also showed different major peaks around 855.61 eV and the satellites, and these peaks are attributed to the Ni$^{2+}$ oxidation state derived from Ni(OH)$_2$. The Ni$^{2+}$ binding energy derived from Ni(OH)$_2$ is different from that of NiO. This is because the binding in NiO has a far stronger effect on the charge transfer from an oxygen ligand than for the hydroxide and oxyhydroxide. The high-resolution XPS spectrum of Co $2p_{3/2}$ in the CCS Ni—Co Nws showed major peaks at 781.19 eV, indicating the presence of Co$^{2+}$. In comparison with the Ni—Co Nws, the state of the O 1s spectra showed different appearances. The peaks associated with the metal oxide disappeared, and the peaks associated with oxygen in the hydroxide group only appeared (531.11 eV). In particular, the peak corresponding to a metal carbonate appeared at 532.08 eV. The feature described in the O 1s spectra is the evidence supporting the formation of a metal carbonate hydroxide, together with the coexistence of Ni$^{2+}$ and Co$^{2+}$. The peak appearing at 533.39 eV provides evidence supporting the presence of an oxygen-containing functional group, such as an epoxide and a carboxyl group (C—O—C, COOH) in the carbon coating layer. These results are precisely consistent with the FT-IR analysis.

Figure 13B:
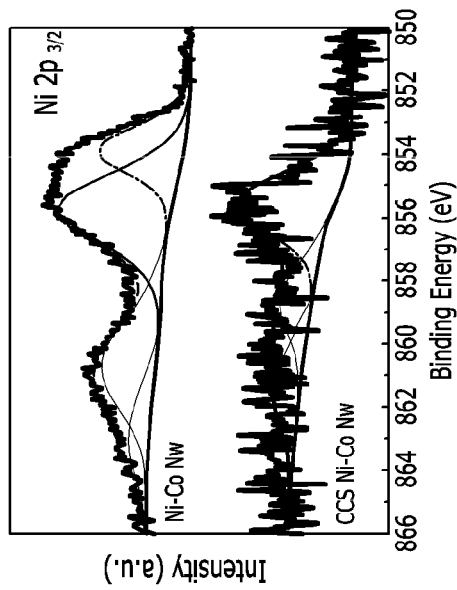
FIG. 13b is a graph showing the results of X-ray photoelectron spectroscopy (XPS) of Ni—Co Nws in the catalyst electrode according to Comparative Example 1 and CCS Ni—Co Nws in the catalyst electrode according to Example 1 is the results of high-resolution XPS analysis for Ni 2p.
Figure 13D:
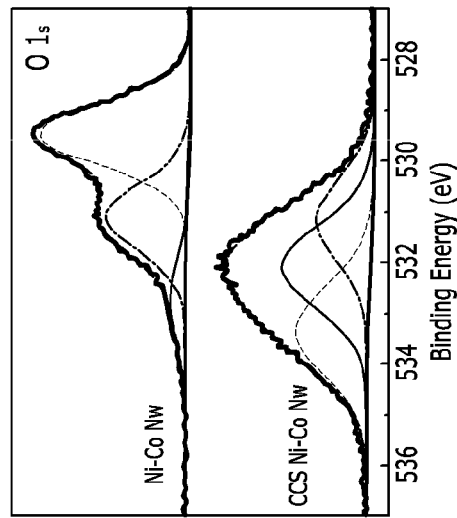
FIG. 13d is a graph showing the results of X-ray photoelectron spectroscopy (XPS) of Ni—Co Nws in the catalyst electrode according to Comparative Example 1 and CCS Ni—Co Nws in the catalyst electrode according to Example 1 is the results of high-resolution XPS analysis for O is.
Figure 13A:
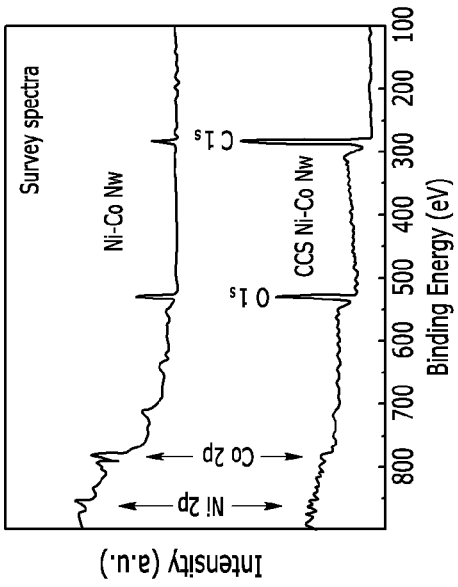
FIG. 13a is a graph showing survey spectra from the results of X-ray photoelectron spectroscopy (XPS) of Ni—Co Nws in the catalyst electrode according to Comparative Example 1 and CCS Ni—Co Nws in the catalyst electrode according to Example 1.
Figure 13C:
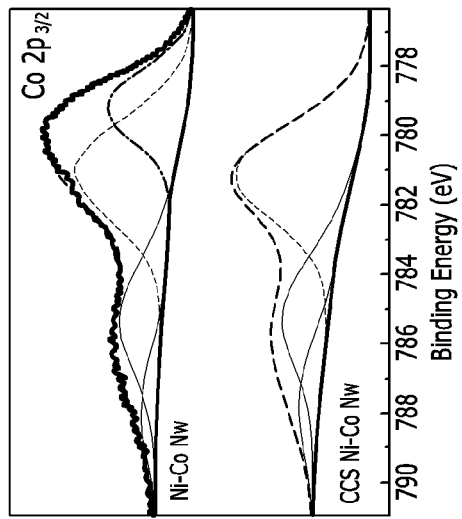
FIG. 13c is a graph showing the results of X-ray photoelectron spectroscopy (XPS) of Ni—Co Nws in the catalyst electrode according to Comparative Example 1 and CCS Ni—Co Nws in the catalyst electrode according to Example 1 is the results of high-resolution XPS analysis for Co 2p.

The Ni $2p_{3/2}$ and Co $2p_{3/2}$ spectra at CCS Ni—Co Nws showed a reduced peak intensity compared to that of Ni—Co Nws due to the presence of the carbon coating layer on the surface (see FIGS. 13a to 13c). Because the XPS is a surface-sensitive analysis technique that analyzes up to a few nanometers from the surface, it can be sufficiently predicted that the thin carbon layer is well coated with the nanowires in the CCS Ni—Co Nws. In addition, from these results, it can be predicted that a thorough coating of the oxygen-functionalized carbon surrounding the nanowires, an increase in water accessibility, a high OER activity and an excellent electron transfer between Ni—Co nanowires and carbon fibers are possible.

Experimental Example 2

In order to evaluate the role of the amorphous carbon coating layer on the catalytic activity of CCS Ni—Co Nws, an electrochemical analysis was performed.

An electrode including only a bare carbon fabric, the catalyst electrode including Ni—Co Nw according to Comparative Example 1, and the catalyst electrode including CCS Ni—Co-Nw according to Example 1 were each used as a working electrode for OER (size: 1×1 cm$^2$). The OER of the electrodes in a 1M KOH aqueous electrolyte in a 3-electrode cell was determined using a multichannel potentiostat/galvanostat/impedance analyzer (VersaStat3, Princeton Applied Research, USA). Herein, a saturated Ag/AgCl electrode was used as a reference electrode, and a platinum rod was used as a counter electrode All electrochemical tests were performed in the same cell batch and concentration, and the potentials were IR-corrected. These potentials were converted to a reversible hydrogen electrode (RHE) scale according to the following Nernst equation after correction for ohmic losses.

$$ERHE=E_{Ag}/AgCl+0.059 \text{ pH}+0.197 \qquad \text{[Equation 1]}$$

The water oxygen activity for other electrodes was evaluated by comparison with polarization curves obtained using linear sweep voltammetry (LSV). During each LSV, the voltage applied to the working electrode was varied linearly from 1.023 to 1.823 V relative to RHE at a scanning rate of 1 mV s−1. The results are shown in FIGS. 14A and 14B.

Figure 14A:
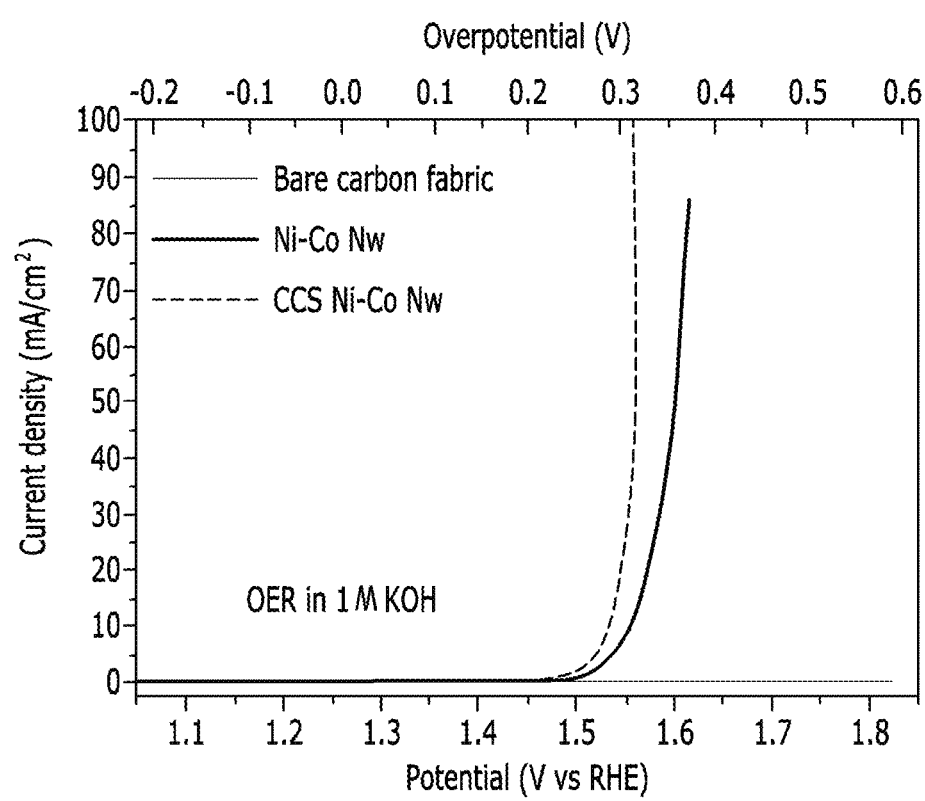
FIG. 14A is a graph showing the polarization curves for an electrode (bare carbon fabric) including only carbon fiber fabric, the catalyst electrode including Ni—Co Nw according to Comparative Example 1, and the catalyst electrode including CCS Ni—Co-Nw according to Example 1 during OER.
Figure 14B:
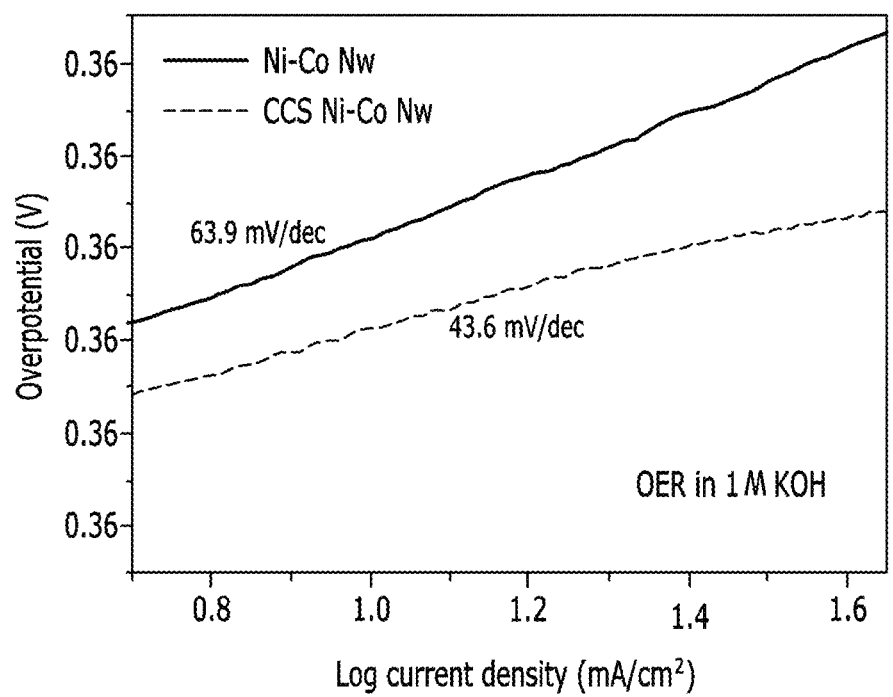
FIG. 14B is a graph showing Tafel plots of the catalyst electrode including Ni—Co Nw according to Comparative Example 1 and the catalyst electrode including CCS Ni—Co-Nw according to Example 1 obtained from the polarization curves.

FIG. 14A shows the polarization curves for the electrode including only bare carbon fabric, the catalyst electrode including Ni—Co Nw according to Comparative Example 1, and the catalyst electrode including CCS Ni—Co-Nw according to Example 1 during OER.

As a result of the experiment, the catalyst electrode including the Ni—Co Nw according to Comparative Example 1 and the catalyst electrode including the CCS Ni—Co-Nw according to Example 1 showed high performance for OER, while the electrode including only the bare carbon fabric showed a negligibly low OER activity. That is, it can be confirmed that the electrode substrate of the carbon fiber fabric does not substantially contribute to the OER activity, and that the Ni—Co Nws grown on the carbon fiber fabric dominantly affect the OER activity.

Further, the catalytic current of the CCS Ni—Co Nws was shifted compared to that of Ni—Co Nws, confirming the positive effect of the carbon coating layer on the OER. Considering the solar fuel synthesis efficiency, the CCS Ni—Co Nws should exhibit an overpotential of 302 mV relative to RHE, along with a sufficient water decomposition gas release to implement a current density of 10 mA cm$^{-2}$. In the case of Ni—Co Nws, they showed an overpotential of 322 mV relative to RHE, indicating that a much higher potential is required. Furthermore, it can be seen that the CCS Ni—Co Nws electrode exhibited a far higher activity by exhibiting a larger current density compared to the Ni—Co Nws at a fixed overpotential. Specifically, when the overpotential was fixed at 320 mV relative to RHE, the current density of the CCS Ni—Co Nws electrode was 24.8 mA cm$^{-2}$, exhibiting a 2.7-fold higher current density than the Ni—Co Nws electrode (9.1 mA cm$^{-2}$).

Additionally, Tafel plots were obtained from the polarization curves of FIG. 14A to have a better understanding of the kinetics of the electrodes (see FIG. 14B).

As the Tafel slope decreases, the more favorable the water accessibility becomes. The Tafel slopes of the CCS Ni—Co Nws and Ni—Co Nws electrodes were 43.6 mV dec$^{-1}$ and 63.9 mV dec$^{-1}$, respectively, and the catalytic behavior of the CCS Ni—Co Nws was found to be more favorable than that of the Ni—Co Nws. The improved OER activity of such CCS Ni—Co Nws electrode was attributed to the maximized utilization of the efficient active sites.

Further, even at a higher overpotential range, the CCS Ni—Co Nws exhibited a lower Tafel slope. In many cases, materials having a low Tafel slope exhibit a kinetic change along with a higher Tafel slope at the high overpotential range, but the CCS Ni—Co Nws exhibited a low Tafel slope even at the high voltage range due to an excellent effect of electron transfer.

Furthermore, the turnover frequency (TOF), which is an index indicating the intrinsic activity of a catalyst, was evaluated. The TOF was defined as the number of oxygen molecules generated at unit active site per second. The TOF value was calculated according to the following Equation 2:

$$TOF=JA/4Fn, \qquad \text{[Equation 2]}$$

wherein J is the current density (mA cm$^{-2}$), A is the surface area of an electrode (cm$^2$), F is the Faradaic constant (96 485 C mol$^{-1}$), and n is the number of moles of metal atoms on a working electrode.

As a result of the experiment, the CCS Ni—Co Nws showed a TOF value of 8.6×10$^{-3}$ s$^{-1}$ at an overpotential of 300 mV, which was clearly increased compared to the TOF value of the Ni—Co Nws (2.8×10$^{-3}$ s$^{-1}$).

Figure 15A:
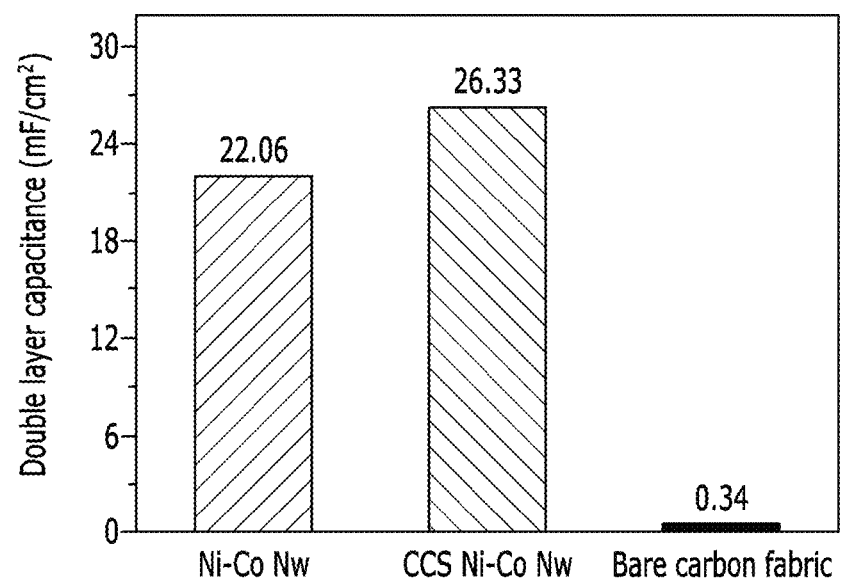
FIG. 15A is a graph showing the electrochemically active surface area (ECSA) of the electrode (bare carbon fabric) including only carbon fiber fabric, the catalyst electrode including Ni—Co Nw according to Comparative Example 1, and the catalyst electrode including CCS Ni—Co-Nw according to Example 1.

In addition, in order to evaluate the difference in performance between the catalyst electrode including the Ni—Co Nw according to Comparative Example 1 and the catalyst electrode including the CCS Ni—Co-Nw according to Example 1, the electrochemically active surface area (ECSA) was measured from the double-layer capacitance ($C_{dl}$) at the solid-liquid interface. The results are shown in FIG. 15A.

As a result of the experiment, the Cdl of the catalyst electrode including the CCS Ni—Co Nw according to Example 1 was 26.33 mF cm$^{-2}$, while the Cdl of the catalyst electrode including the Ni—Co Nw according to Comparative Example 1 was 22.06 mF cm$^2$. From this, the CCS Ni—Co Nws showed a 20% increase in the electrochemically active surface area, and the number of active sites effective for oxidation of water oxidation increased after the formation of the porous carbon coating layer, which implies that the OER performance is enhanced.

The seamless carbon coating layer surrounding the nanowires in contact with the carbon fibers provides a continuous electron transfer passage for a rapid electron transfer from the water oxidation active site to the current collector, and allows to reduce the electron transfer distance, thereby improving the reaction kinetics.

In addition, an electrochemical impedance spectroscopy (EIS) was performed to study the reaction kinetics in these samples. The results are shown in FIG. 15B.

Figure 15B:
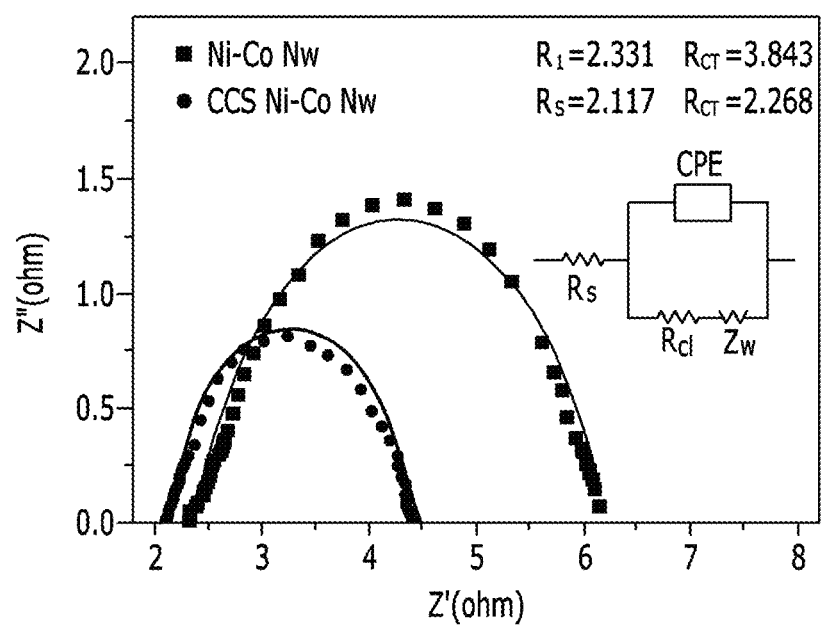
FIG. 15B is a graph showing the results of electrochemical impedance spectroscopy (EIS) of the catalyst electrode including Ni—Co Nw according to Comparative Example 1 and the catalyst electrode including CCS Ni—Co-Nw according to Example 1.

As shown in FIG. 15B, Nyquist plots were observed, and the Nyquist trace was fitted into an equivalent circuit (interpolated in FIG. 15B). A Randle circuit, which is commonly used in a charge transfer analysis for a single electrode, was also used in this experiment. The Ni—Co Nws and CCS Ni—Co Nws electrodes exhibited similar series resistance (Rs).

Further, the lower the charge transfer resistance (Rct), the faster the kinetic reaction. Compared to the Ni—Co Nws electrode, the CCS Ni—Co Nws electrode exhibited a lower Rct, which resulted in an increase in the current connection to the electrode and an enhancement in the ability of electron and charge transfer.

The seamless carbon-based configuration of the 3D catalyst-based CCS Ni—Co Nws electrode makes it possible to transfer efficient charge carrier through the entire electrode. From the viewpoint of a practical application, the durability of the electrode for water oxidation is important. Chronoamperometric measurements were performed at potentials corresponding to those driven at a current density of 20 mA cm$^{-2}$ for 10 hours, and the results are shown in FIG. 16.

Figure 16:
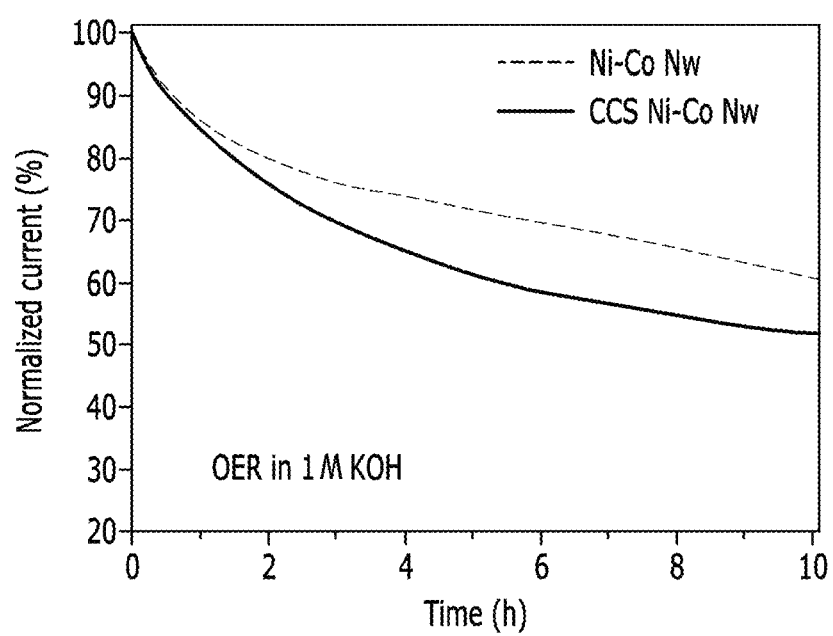
FIG. 16 is a graph showing the results of chronoamperometric measurements of the catalyst electrode including Ni—Co Nw according to Comparative Example 1 and the catalyst electrode including CCS Ni—Co-Nw according to Example 1.

As shown in FIG. 16, the catalyst electrode including the CCS Ni—Co Nw according to Example 1 maintained 62% of the initial current density after the test, which was more excellent than 50% of the retention rate of the catalyst electrode including the Ni—Co Nw according to Example 1. In the catalyst electrode including the CCS Ni—Co Nw according to Example 1, the carbon coating layer maintained the layer, supported the specific structure of the nanowires, and prevented the dispersion of the catalyst particles during the intense O$_2$ evolution. As a result, the CCS Ni—Co Nws electrode exhibited improved stability and durability during the extended OER operation.

In addition, Faradaic efficiency of the catalyst electrode including the CCS Ni—Co Nw according to Example 1 was measured.

Specifically, a sealed electrochemical cell in a 3-electrode configuration was used, and a potentiostatic electrolysis was performed in 1M KOH while applying a bias of 1.6 V relative RHE for 4000 s. Before the experiment, the electrolytes in the 1 M KOH solution were subjected to a vacuum treatment for several times to remove the air, and then back-filled ultra-pure argon was introduced into the system. The generated oxygen was analyzed by thermal online gas chromatography (GC) (DS science equipped with conductivity detector, MS-5A column, argon carrier gas) while performing chronoamperometry by injecting a potential of 1.6 V relative to RHE. The concentration of the gas product was analyzed by GC through an automatic sampling every 3 minutes. During the OER, the n$_{o2}$ (experimental) was estimated from the amount of observed gases, and a n$_{o2}$ theoretical value was calculated from the theoretical moles of oxygen generated, using the following Equation 3.

$$n_{O_2}(\text{theoretical}) = \frac{Q}{nF} \quad \text{[Equation 3]}$$

wherein n$_{o2}$ is the number of moles of oxygen produced, Q is the charge that passes through an electrode, F is the Faradaic constant (96485 C mol$^{-1}$), and n is the number of electrons transferred during the OER (four moles of electrons per mole of O$_2$). Therefore, the Faradaic efficiency can be determined by the following Equation 4.

$$\text{Faradaic efficiency} = \frac{n_{O_2}(\text{experimental})}{n_{O_2}(\text{theoretical})} \times 100 \quad \text{[Equation 4]}$$

Figure 17:
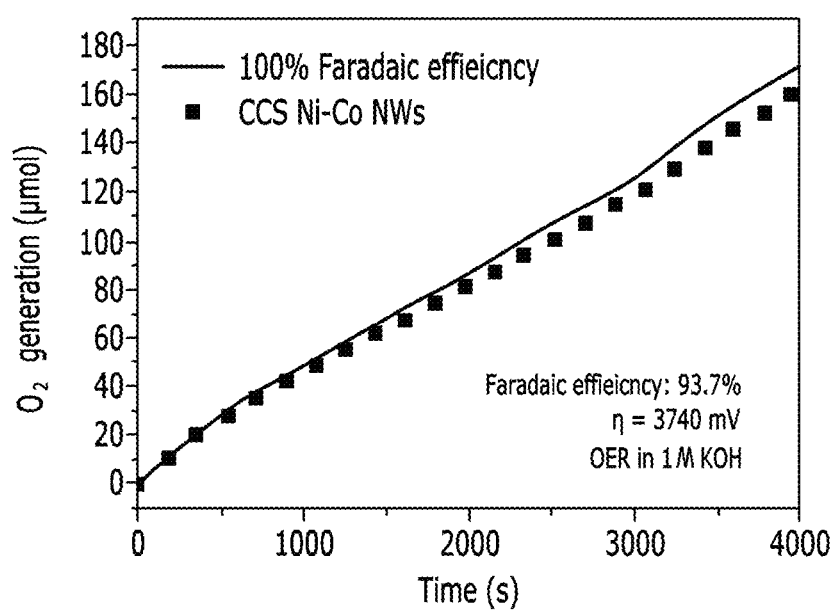
FIG. 17 is a graph showing the Faraday efficiency of the catalyst electrode including CCS Ni—Co-Nw according to Example 1.

The results are shown in FIG. 17.

A gas bubble release was observed at the surface of the 3D conductive catalyst electrode, and as shown in FIG. 17, the measured amount of oxygen gas coincided with the theoretical value calculated based on the transferred charge. The Faradaic efficiency was 93.7%, indicating that the generated charge was nearly consumed for OER in the CCS Ni—Co Nws electrode.

The three-dimensional conductive nanostructure of the Ni—Co nanowires having a core-shell structure grown on the carbon fiber fabric can serve as a highly effective electrochemical catalyst for OER, and the network of nanowires formed through hydrothermal, carbonization and annealing processes can exhibit a catalytic activity with high conductivity. Further, the Ni—Co nanowires, which are mesoporous and have a granular structure, significantly increase the catalytic surface area, and the conductive carbon coating layer enables a fast and easy electron transfer through the entire electrode. Furthermore, the carbon coating serves to prevent the dispersion of the nanowire catalyst during the intense oxygen evolution reaction and provides much stronger structural integration and reliability. It maximizes the utilization of the effective active sites, accelerates the OER rates, thereby continuously exhibiting high-efficiency electrocatalytic performance. In addition, the three-dimensional structure required an overpotential value of 302 mV to generate a current density value of 10 mA/cm, together with an extremely small Tafel slope of 43.6 mV dec. Therefore, it can be confirmed therefrom that it can be practically applied to the field of energy change and storage as well as water decomposition.

The invention claimed is:

1. A catalyst electrode for oxygen evolution comprising:
an electrode current collector comprising a carbon fiber fabric, wherein the carbon fiber fabric comprises a plurality of carbon fibers, each elongated substantially in an axial direction and having a substantially radially outward facing cylindrical surface;
a nanowire layer comprising a plurality of metal oxide-based porous nanowires grown radially from the surface of each of the carbon fibers;
a porous carbon coating layer disposed around the outer surface of the metal oxide-based porous nanowires; and
a mesoporous pore network formed by internetworking of the pores included in the metal oxide-based porous nanowires and porous carbon coating layer,
wherein the carbon fiber fabric has a weave construction;
wherein the metal oxide-based porous nanowires grown from each carbon fiber exhibit tapering in which the widths become thinner gradually towards the end of the metal oxide-based porous nanowires with distance from the carbon fiber.

2. The catalyst electrode for oxygen evolution of claim 1, wherein the pores included in the metal oxide-based porous nanowire and carbon coating layer are each independently meso-sized pores.

3. The catalyst electrode for oxygen evolution of claim 1, wherein the metal oxide-based porous nanowire has an aspect ratio of 10 to 50.

4. The catalyst electrode for oxygen evolution of claim 1, wherein the metal oxide-based porous nanowire is formed by laminating granular nanoparticles in the form of a wire.

5. The catalyst electrode for oxygen evolution of claim 1, wherein the metal oxide comprises any one or two or more metal elements selected from the group consisting of Li, Co, Ni, Zn, Fe, Ti, Na, Mn, Cu, Ga, Sn, Cr and W.

6. The catalyst electrode for oxygen evolution of claim 1, wherein the porous carbon coating layer comprises a hydrophilic group.

7. The catalyst electrode for oxygen evolution of claim 1, wherein the metal oxide-based porous nanowire having the porous carbon coating layer formed thereon has a BET specific surface area of 40 m$^2$g$^{-1}$ or higher, a pore volume of 0.15 cm$^3$g$^{-1}$ or higher, and an average pore size of 5 to 15 nm.

8. The catalyst electrode for oxygen evolution of claim 1, wherein the metal oxide-based porous nanowire having the porous carbon coating layer formed thereon exhibits two pore size distributions in the range of 4.0 to 5.0 nm and in the range of 10 to 40 nm.

9. The catalyst electrode for oxygen evolution of claim 1, further including a second carbon coating layer disposed on the electrode current collector, wherein the second carbon coating layer is continuously connected to the carbon coating layer surrounding the surface of the metal oxide-based porous nanowire.

10. The catalyst electrode for oxygen evolution of claim 1, wherein the metal oxide-based porous nanowires grown from each carbon fiber are substantially conical in shape.

11. A method for preparing the catalyst electrode for oxygen evolution of claim 1 comprising the steps of:
   forming a precursor nanowire for forming a metal oxide-based nanowire on an electrode current collector including a carbon fiber fabric through a hydrothermal reaction in a precursor solution for forming a metal oxide-based nanowire, and
   coating the surface of the precursor nanowire for forming a metal oxide-based nanowire using a precursor solution for forming a carbon coating layer, followed by subjecting it to hydrothermal carbonization at 120 to 200° C., and then annealing at 250 to 800° C.

12. The method for preparing the catalyst electrode for oxygen evolution of claim 11, wherein the formation of the precursor nanowire for forming a metal oxide-based nanowire is performed by immersing the electrode current collector in the precursor solution for forming a metal oxide-based nanowire, followed by subjecting it to hydrothermal reaction at a temperature of 90 to 180° C.

13. The method for preparing the catalyst electrode for oxygen evolution of claim 11, wherein the precursor for forming a metal oxide-based nanowire is selected from the group consisting of a chloride, an acetate, a nitrate, a hydrate and a hydroxide including at least one metal, and
   the metal is selected from the group consisting of Li, Co, Ni, Zn, Fe, Ti, Na, Mn, Cu, Ga, Sn, Cr and W.

14. The method for preparing the catalyst electrode for oxygen evolution of claim 11, wherein the precursor solution for forming a metal oxide-based nanowire further comprises at least one of surfactants and base materials.

15. The method for preparing the catalyst electrode for oxygen evolution of claim 11, further comprising an ultrasonic treatment process for the electrode current collector prior to the hydrothermal reaction.

16. The method for preparing the catalyst electrode for oxygen evolution of claim 11, the annealing is performed by raising the temperature up to 250 to 800° C. at a rate of 3 to 5° C. per minute under an inert gas atmosphere.

17. A hydrogen energy source device requiring hydrogen production through electrolysis of water, which comprises the catalyst electrode for oxygen evolution according to claim 1 as an anode electrode.

* * * * *